US007792730B2

(12) United States Patent
Kastel et al.

(10) Patent No.: US 7,792,730 B2
(45) Date of Patent: *Sep. 7, 2010

(54) RESOURCE AMOUNT DETERMINATION TECHNIQUE

(75) Inventors: Peter Kastel, Frankfurt am Main (DE); Tobias Sprohnle, Frankfurt am Main (DE); James Wood, London (GB)

(73) Assignee: Deutsche Borse AG, Frankfurt am Main (DE)

( * ) Notice: Subject to any disclaimer, the term of this patent is extended or adjusted under 35 U.S.C. 154(b) by 1621 days.

This patent is subject to a terminal disclaimer.

(21) Appl. No.: 10/880,349

(22) Filed: Jun. 30, 2004

(65) Prior Publication Data

US 2005/0108128 A1 May 19, 2005

(30) Foreign Application Priority Data

Nov. 19, 2003 (EP) .................................. 03026605

(51) Int. Cl.
*G06O 40/00* (2006.01)
(52) U.S. Cl. ..................... 705/36 R; 705/35; 705/37
(58) Field of Classification Search ............. None
See application file for complete search history.

(56) References Cited

U.S. PATENT DOCUMENTS

| 6,304,858 | B1* | 10/2001 | Mosler et al. ................ 705/37 |
| 2003/0115125 | A1* | 6/2003 | Lee et al. ..................... 705/36 |
| 2004/0111355 | A1* | 6/2004 | Hirani et al. ................. 705/37 |
| 2004/0181475 | A1* | 9/2004 | Haroon ........................ 705/35 |
| 2005/0010481 | A1* | 1/2005 | Lutnick et al. .............. 705/26 |
| 2005/0044034 | A1* | 2/2005 | Perry et al. .................. 705/37 |
| 2005/0108145 | A1* | 5/2005 | Kastel et al. ................ 705/37 |

OTHER PUBLICATIONS

Managing Financial Risk: A Guide to Derivative Products, Financial Engineering, and Value Maximization, Charles W. Smithson, McGraw-Hill, p. 162-76, 303-05, 1998 ("Financial Risk").*
Managing Financial Risk: A Guide to Derivative Products, Financial Engineering, and Value Maximization, Charles W. Smithson, McGraw-Hill, p. 162-76, 303-05, 1998.*
Minton, Bernadette A., An Empirical Examination of Basic Valuation Models for Plain Vanilla U.S. Interest Rate Swaps, 1997, OH State U, Journal of Financial Economics, Journal Volume & Issue: 44 2, pp. 251-277.*
Bierwag, Gerald O.; Kaufman, George G., Duration Gaps with Futures and Swaps for Managing Interest Rate Risk at Depository Institutions, 1992, Journal of Financial Services Research, 53, 217-34.*

* cited by examiner

*Primary Examiner*—Hani Kazimi
*Assistant Examiner*—Kellie Campbell
(74) *Attorney, Agent, or Firm*—Marc S. Kaufman; Nixon Peabody, LLP

(57) ABSTRACT

A data processing system and method are provided for repetitively determining a resource amount for counterbalancing the transfer of a failure risk pertaining to a bundle of constructs that may individually fail. The system has data storage for storing reference values of the bundle of constructs for distinct individual time instances during the resource amount determination. The reference values indicate a value of a respective reference construct or a value of a reference bundle of constructs. The system further has a calculation unit connected to the data storage for calculating a value of the resource amount for an individual time instance based on the reference values. The technique is suitable for valuing a futures contract that is based on a basket of credit default swaps as underlyings.

23 Claims, 2 Drawing Sheets

RESOURCE AMOUNT DETERMINATION TECHNIQUE

BACKGROUND OF THE INVENTION

1. Field of the Invention

The invention generally relates to data processing systems and methods for repetitively determining a resource amount for counterbalancing the transfer of a failure risk pertaining to a bundle of constructs that may individually fail, and more particularly to data processing systems and methods for valuing a futures contract that is based on a basket of credit default swaps as underlyings.

2. Description of the Related Art

Many techniques exist where a bundle of constructs is used that may individually fail. Constructs may be hardware arrangements in computer systems or other automated systems, or may be software routines. It is further well known in the art that even more abstract constructs exist such as a conditional relationship between physical or non-physical entities.

Any such construct may fail, in the sense that the task or function assigned to that construct is not (completely) fulfilled. For instance, a hardware component may break, a software routine may dysfunction or even stop performing, or a condition can lead to negative results or can be rendered void.

When operating a bundle of constructs that may individually fail, the overall failure risk may depend on the individual failure probabilities. The failure risk may also change with the time. In this case, it is sometimes found to be detrimental that failure events are not exactly predictable. For this reason, the failure risk pertaining to a bundle of constructs may be transferred to an entity that then assumes the overall failure risk. For instance, a hardware controller or a software program may assume the risk that one or more computer hardware or software constructs fail, by stepping into the functions of these constructs in case of a failure.

To compensate or counterbalance this transfer of a failure risk, the risk assuming entity may receive an extra resource amount. Resources may for instance be processor access times, memory capacity, prioritization over other components in the handling of tasks, etc.

Another field where such techniques can be applied to is the valuation of futures contracts that are based on a basket of credit default swaps as underlyings. Credit default swaps are the most commonly traded credit derivatives. A credit default swap is a contract where one party (the "protection seller") receives a premium from another party (the "protection buyer") for assuming the credit risk of a specified obligation. In return for this premium, the protection buyer will receive a payment from the protection seller upon the occurrence of a credit event.

However, in all of the above techniques, the compensation is rather difficult to value, due to the complexity and rapid time variation of the various input parameters. The prior art techniques are therefore cumbersome and often lead to unreliable valuation results.

SUMMARY OF THE INVENTION

According to one embodiment, a data processing system is provided for valuing a futures contract that is based on a basket of credit default swaps as underlyings. The system comprises a data storage for storing credit spread values for each credit default swap in the basket for each individual valuation time instance relating to the futures contract, and a calculation unit connected to the data storage for calculating a value of the futures contract for an individual valuation time instance based on the credit spread values of the credit default swaps in the basket.

According to another embodiment, a data processing method of valuing a futures contract that is based on a basket of credit default swaps as underlyings is provided. The method comprises storing credit spread values for each credit default swap in the basket for each individual valuation time instance relating to the futures contract, and calculating a value of the futures contract for an individual valuation time instance based on the credit spread values of the credit default swaps in the basket.

According to yet another embodiment, a computer-readable storage medium stores instructions that, when executed by a processor, cause the processor to value a futures contract that is based on a basket of credit default swaps as underlyings, by accessing a storage having stored therein credit spread values for each credit default swap in the basket for each individual valuation time instance relating to the futures contract, and calculating a value of the futures contract for an individual valuation time instance based on the credit spread values of the credit default swaps in the basket.

According to yet another embodiment, there is provided a data processing system for repetitively determining a resource amount for counterbalancing the transfer of a failure risk pertaining to a bundle of constructs that may individually fail. The system comprises a data storage for storing reference values of the bundle of constructs for distinct individual time instances during the resource amount determination. The reference values indicate a value of a respective reference construct or a value of a reference bundle of constructs. The system further comprises a calculation unit connected to the data storage for calculating a value of the resource amount for an individual time instance based on the reference values.

According to a further embodiment, a data processing method of repetitively determining a resource amount for counterbalancing the transfer of a failure risk pertaining to a bundle of constructs that may individually fail is provided. The method comprises storing reference values of the bundle of constructs for distinct individual time instances during the resource amount determination. The reference values indicate a value of a respective reference construct or a value of a reference bundle of constructs. The method further comprises calculating a value of the resource amount for an individual time instance based on the reference values.

According to still a further embodiment, a computer-readable storage medium stores instructions that, when executed by a processor, cause the processor to repetitively determine a resource amount for counterbalancing the transfer of a failure risk pertaining to a bundle of constructs that may individually fail, by accessing a storage storing reference values of the bundle of constructs for distinct individual time instances during said resource amount determination, where the reference values indicate a value of a respective reference construct or a value of a reference bundle of constructs, and calculating a value of the resource amount for an individual time instance based on the reference values.

BRIEF DESCRIPTION OF THE DRAWINGS

The accompanying drawings are incorporated into and form a part of the specification for the purpose of explaining the principles of the invention. The drawings are not to be construed as limiting the invention to only the illustrated and described examples of how the invention can be made and used. Further features and advantages will become apparent from the following and more particular description of the invention, as illustrated in the accompanying drawings, wherein.

DETAILED DESCRIPTION OF THE INVENTION

Figure 1:
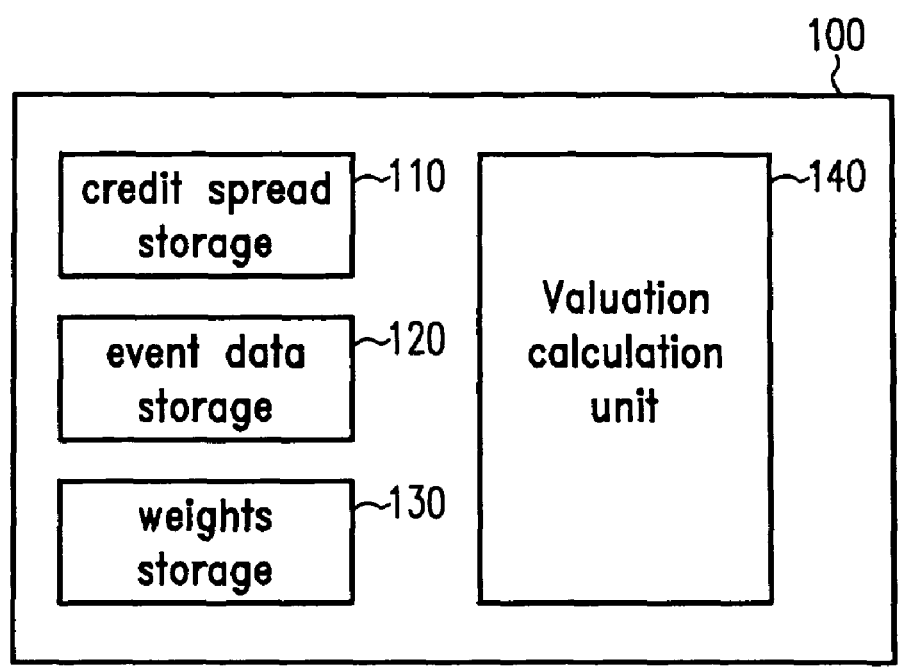
FIG. 1 illustrates a data processing system according to an embodiment of the invention.
Figure 2:
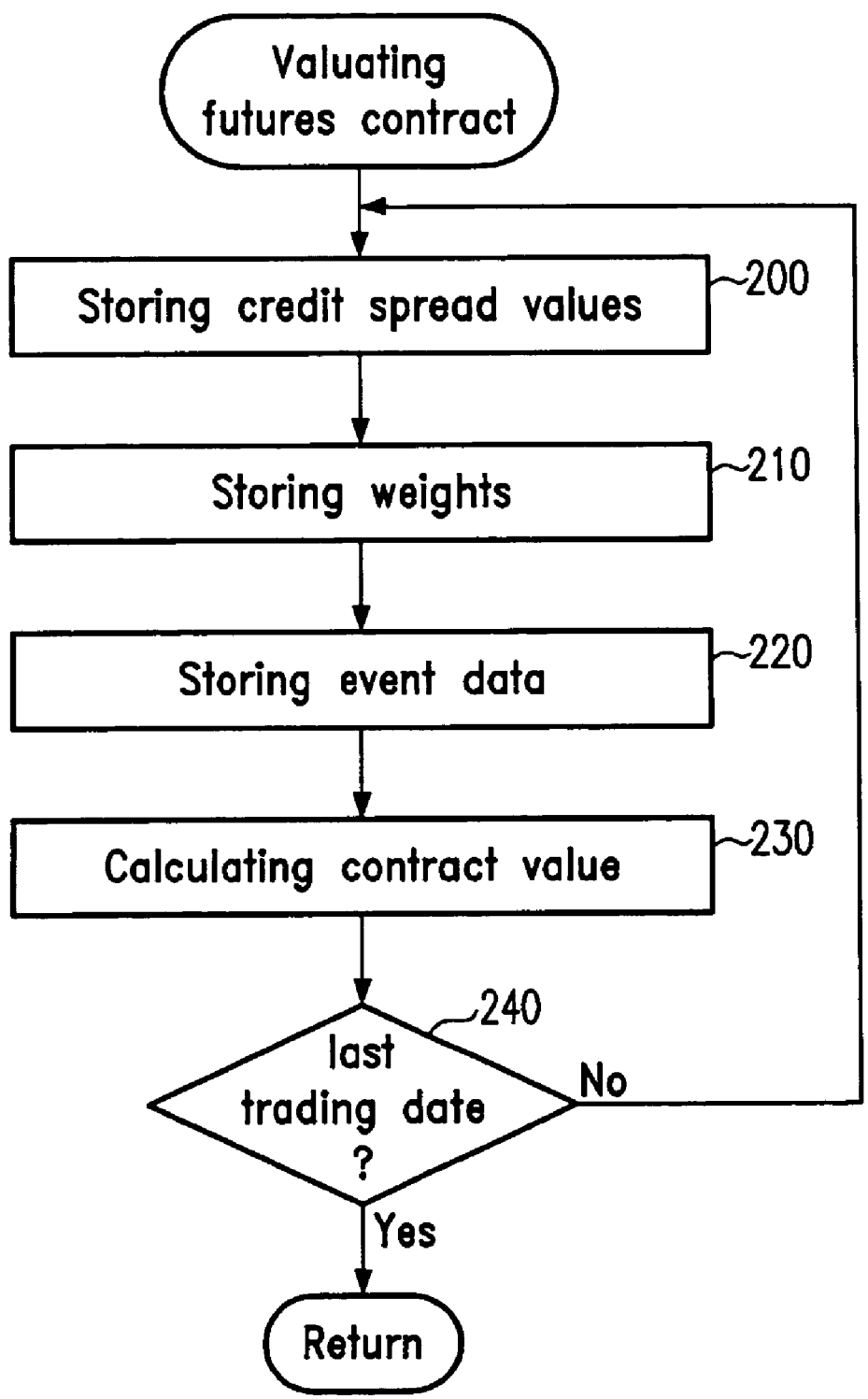
FIG. 2 illustrates a corresponding data processing method according to an embodiment of the invention.

The illustrative embodiments of the present invention will be described with reference to the figure drawings wherein like elements and structures are indicated by like reference numbers. Further reference is made to the glossary of terms at the end of the present description.

In the following, embodiments will be described with respect to futures contracts that are based on baskets of credit default swaps as underlyings. It is however to be noted that generally, a data processing system 100 is provided for repetitively determining a resource amount for counterbalancing the transfer of a failure risk pertaining to a bundle of constructs that may individually fail.

The system comprises a data storage 110-130 for storing credit spreads, event data, and weights in steps 200-220, and a calculation unit 140 for calculating the contract value in step 240. These functions will become more apparent from the detailed description below.

Discussing first several aspects of the embodiments, and the differences to existing financial instruments, these aspects can be summarized as follows. The embodiments (i) provide an exchange traded credit instrument, (ii) allow the user to assume pure credit risk, (iii) enable defined default payments (which may be binary), (iv) allow for a gradual settlement of changes in credit quality, (v) provide for a cash settlement of a default swap after a credit event, (vi) allow the user to assume credit risk from multiple sources, (vii) provide future contracts of reduced notional, and (viii) allow the user to eliminate the risk of correlation between the creditworthiness of a reference obligor and an OTC counterparty that sells protection. These features will now be described in more detail according to the embodiments.

(i) The contract may be exchange traded. In contrast, all conventional products that give an exposure to credit risk in isolation of other risks (e.g. interest rate risks) are OTC (over-the-counter) products.

There are many advantages to users of listing a credit derivative product on an exchange. For example, deal cost is reduced, price transparency improves and contracts become more standardized. Also there is likely to be greater liquidity on an exchange and counterparty credit risk will be reduced. In addition, trades can be executed with smaller deal sizes on an exchange than is possible in the OTC market. This is advantageous to institutions that desire to hedge credit risk having a notional size that is not a multiple of $1,000,000 or €1,000,000.

Furthermore, many potential users are prohibited from trading in OTC derivatives, but are allowed to trade listed instruments. Currently, such users can only assume exposure to the credit markets by trading bonds.

(ii) The contract may have very low interest rate sensitivity. The user may then be able to assume credit risk in isolation from interest rate risk.

The asset swap market does not allow pure credit risk to be assumed without also assuming credit contingent interest rate risk. This is because in the asset swaps market changes in credit spread are monetized using offsetting interest rate swaps. Interest rate swaps do not terminate in the event of a credit event.

Trading fixed rate bonds does not allow pure credit risk to be assumed; a fixed rate bond's value contains an element due to credit risk and an element due to interest rate risk. Also, a view on increasing credit spreads can only be monetized by shorting a bond in the repo market. The cost of shorting a bond is therefore a function of the repo rate—the behaviour of this rate is complex and not closely related to the credit markets.

(iii) The contract of the present embodiments allows to-pay paying out a fixed pre-specified amount LGD (Loss Given Default) following a credit event. Because LGD may be pre-specified on the futures launch date, there is no uncertainty over the amount that the underlying default swap will pay on default.

In contrast, the OTC credit default swaps settle with reference to the actual recovery rate which is observed after the credit event. It is not possible to observe this recovery rate prior to a credit event. Therefore the payments made by an OTC default swap after a credit event cannot be determined in advance. Furthermore, the value of a default swap is a function of the assumed recovery rate. As the recovery rate cannot be observed, the valuation of the default swap can only be determined to the accuracy of the recovery rate estimate.

Similarly, in the asset swap market, the swap fixed rate payer continues to own the bond after a credit event. Therefore the loss experienced is a function of that bond's recovery rate. Furthermore it may be difficult for the bond holder to sell the bond quickly after a credit event, meaning that a holder of an asset swap may not be able to avoid having to wait for the liquidation process to be finalized. This is also the position of a credit default swap protection seller, who after a credit event, receives the defaulted bond and must wait for the liquidation process to be finalilzed.

(iv) In the scenario where an obligor's credit spread widens over several days prior to the obligor defaulting, the contract of the present embodiments allows the gradual settlement of the default payment, i.e. the default payment may be settled every day as the credit spread widens to default.

Gradual settlement of the default payment reduces the exchange's exposure to the protection seller on the day of the credit event, as the protection seller does not need to settle the entire LGD amount all at once.

An OTC market default swap that is cash collateralised may allow a default payment to be gradually settled, if the party that buys protection makes regular margin calls on the seller of protection (based on the present value of the default swap). However such gradual settlement of default payments is asymmetrical—it only applies when the margin payer (e.g. a customer of a bank) is out of the money. For example, if Bank X sells protection to Fund Y and the default of the reference obligor starts to look likely, Fund Y will not in practice be able to call margin from Bank X, although if spreads tighten so that Bank X comes into the money, Bank X may realistically call margin from Fund Y.

Furthermore, a total return swap ('TRS') allows the periodic (e.g. quarterly) settlement of changes in value caused by the deterioration of a reference obligor's creditworthiness. However the TRS is not a pure credit instrument as it carries both interest rate risk and credit risk.

Therefore no currently traded pure credit instrument permits the gradual and symmetric settlement of a credit event.

(v) After a credit event, the contract of the present embodiments may cash settle. The OTC default swap market settles credit events physically, through the delivery of a defaulted bond. Furthermore, although the cash settlement option exists in the OTC default swap market, it is rarely exercised due to complexities in determining the recovery value of a defaulted obligor's debt. From a practical perspective, OTC default swaps are rarely able to be cash settled in a practical manner.

Physical settlement has many disadvantages to users. When a restructuring credit event is triggered, each of the available deliverable obligations with a different maturity will have a different market value. Therefore there will be a 'cheapest to deliver' deliverable obligation. Demand for this particular obligation can skew recovery prices. Also, lenders who hedge loans with default swaps are reluctant to deliver the loan after a credit event because such transfers are likely to lead to deterioration in the lender-borrower relationship. Accounting, regulatory and legal constraints prevent the delivery of certain obligation types and some obligations are not permitted as deliverables by the ISDA documentation. Also some institutions legally may not take delivery of certain types of obligation—for example some corporations (including insurers) cannot own loans. Finally there is a general reluctance to deliver defaulted obligations as some protection buyers desire to retain recourse in the event of the eventual winding up of the company.

In summary, physical settlement is very complex. Such complexity makes it more difficult for new institutions to enter the OTC credit derivatives market. A default swap based contract that cash settles in a very simple manner after a credit event will facilitate such users' entry into the credit markets.

(vi) The contract of the present embodiments allows the user to assume credit risk for an index of several obligors.

Currently, it is difficult for credit market participants to quickly monetize a general view of the credit markets, or a view of an index of sources of credit risk. For example, in the asset swap and OTC default swap markets a general view on the credit markets can only be executed by entering into a large number of single name specific instruments, necessitating a credit analysis of each individual name. Smaller institutions may have insufficient skill or resources to perform such an analysis, even though they may have skill in analysing analyzing the general credit markets.

Several structured products, notably collateralised debt obligations ("CDOs"), are linked to a broad index of obligors. However there is little transparency over CDO pricing, some modelling inputs are unobservable, and highly complex models are required to value the note (which few institutions possess). Furthermore the market in structured notes is both illiquid and one sided (for example it is difficult to short sell a CDO). Also, many investors are prohibited from trading in structured products. Therefore there are substantial reasons why structured notes and CDOs are not suitable for many users.

Furthermore, where an institution wishes to build up a large diversified exposure to the credit risk of a large number of obligors, the length of time needed to build up the portfolio (which must be constructed name by name) can alert the market so that prices move against the institution. For example, if an institution attempts to purchase protection on a large diversified portfolio by entering into single name default swaps, credit spreads in general are likely to rise, so that it becomes more costly to buy the desired portfolio. The contract of the present embodiments would allow large diversified credit exposures to be built up through only one trade, eliminating the losses due to market feedback. In addition, a number of structured financial products based on credit indices are now emerging and are improving participants' abilities to take exposure to the credit markets as a whole.

(vii) The mechanics of the contract of the present embodiments may require that the notional reduces after each credit event. This mechanism may allow users to assume the credit risk of an index of obligors.

Existing futures contracts have fixed notional sizes.

The contract of the present embodiments allows a user to obtain credit protection without being exposed to the failure risk of the protection seller. In the OTC credit default swap market the correlation between the creditworthiness of the protection seller and the reference obligor must often be considered. For example, credit protection purchased from a Korean Bank where the reference obligor is a large Korean Industrial company will be less effective credit protection than protection on the same obligor purchased from a large US bank. This is because the similar obligors (e.g. the Korean bank and Korean Industrial) may be dependent in some way, or may default due to a single shared risk.

Going now into some detail in describing a first embodiment, an index may be defined on the first trading day of the futures contract. The index may initially consist of N obligors, each of which are liquidly traded in the credit markets (e.g. the default swap market), so that the credit spread of each obligor is observable.

The futures contract of the present embodiment is based on the present value of an underlying credit default swap. At any time the notional of the default swap is deemed to be the contract notional multiplied by $\Sigma n_i$, where $n_i$ is the weight of the $i^{th}$ obligor in the index, and where the sum is only taken over the obligors in the index that have not suffered a credit event by that time. The default swap may mature at a fixed date (e.g. 5 years) after the maturity of the futures contract.

In the present embodiment, the appropriate credit spread for valuation of the default swap is the average credit spread of the obligors in the basket that have not suffered a credit event.

Following a credit event on the $i^{th}$ obligor in the index, the default swap pays a defined amount, $LGD \cdot n_i$, in the present embodiment. After this payment the notional of the default swap reduces by $n_i$.

The protection buyer may pay for credit protection at the end of each day for all obligors that had not suffered a credit event on the close of the prior trading day.

For each and every obligor, credit events may be defined using the standard ISDA architecture. While not limited to these examples, the active credit events may be bankruptcy and failure to pay only. It is to be noted that the invention is likewise applicable to any other kind of credit events.

The present embodiment allows for daily payments of variation margins. The daily margin movements of the futures contract are then intended to closely replicate daily changes in the present value of a portfolio of N sources of credit risk as described above. Daily payments may be embodied to reflect the change in present value due to: (i) the evolution of the average survived credit spread during a trading day; (ii) the effect of a credit event (e.g. bankruptcy) occurring; and (iii) the protection buyer's payment for each day's credit protection.

The payment to reflect the evolution of the average survived credit spread and the occurrence of credit events according to the present embodiment will now be described in more detail. On each day, the protection seller may pay to the protection buyer the total of the following amounts (expressed for initial notional of the contract of one, i.e. unity):

(i) $N_{today} \cdot CDS(CS_{average,today}, CS_{average,initial}, S_{today}, T_{today}) -$ (1)

(ii) $N_{yesterday} \cdot CDS$
$(CS_{average,yesterday}, CS_{average,initial}, S_{yesterday}, T_{yesterday}) +$ (iii) $\sum (n_i \cdot LGD_i)$ The summation is taken over the obligors that suffered a credit event on the trading day. In this expression, (i) $N_{today}$ is the weight due to the obligors surviving (i.e. not having cumulatively suffered a credit event) after the close of trading day. That is, $N_{today} = \Sigma n_i$ over the non-defaulted obligors;

(ii) $N_{yesterday}$ is the weight due to the obligors surviving (i.e. not having cumulatively suffered a credit event) after the close of the prior trading day;

(iii) $CS_{average,today}$ is the average credit spread at the end of the day, averaged over the obligors that have survived at the end of the day;

(iv) $CS_{average,yesterday}$ is the average credit spread at the end of yesterday, averaged over the obligors that survived at the end of the prior trading day;

(v) $CS_{average,initial}$ will be the average credit spread of all obligors in the index at the time the futures contract was launched;

(vi) $S_{today}$ is the (e.g. linearly) interpolated swap rate for maturity T on the valuation day;

(vii) $S_{yesterday}$ is the (e.g. linearly) interpolated swap rate for maturity T on the prior valuation day;

(viii) $T_{today}$ is the maturity of the notional CDS contracts, i.e. 5 years plus the time remaining until the futures contract matures;

(ix) $T_{yesterday}$ is the maturity of the notional CDS contracts as measured on the last trading date; and (x) $LGD_i$ is the defined payment per unit notional paid to the protection buyer following a credit event suffered by obligor i. For the initial determination of this parameter, see below.

In the definitions shown above, the indication "yesterday" means the futures trading date preceding today.

The expression (1) shows that defined default payments may be made in the present embodiment. For instance, a fixed pre-specified amount with a binary character, being the notional of the defaulted obligor multiplied by a loss factor LGD, may be paid to the protection buyer after a credit event. Therefore in this instance no recovery rate uncertainty arises in the futures contract (in contrast to OTC default swaps).

It is to be noted that for dates where there are no defaults, $N_{today} = N_{yesterday}$ and the default payment is zero for that day. On such days, cash flows may only reflect the change in present value of the notional default swaps arising from the evolution of the average credit spread during the day.

The present embodiment further provides for reducing the notional. The futures contract notional may decay by $n_i$ (for contracts with an initial notional size of one) after obligor i suffers a credit event.

Payment may be made in the present embodiment for each day's credit protection. At the end of each day, the buyer of protection may be obliged to pay for that day's credit protection on the names that had not defaulted by the close of that trading day. It is to be noted that defaults may be announced after the close of trading on each trading day. Therefore at the end of each day the buyer of protection may be obliged to pay to the seller of protection the following amount (expressed for initial notional of the contract of one):

a. $N_{today} \cdot CS_{average,initial} \cdot DC$ (2)

In this expression, DC is a daycount used to calculate the premium due in one day. For example, if the daycount convention is "act360" then DC=1/360, as the daycount convention assumes that there are 360 days in a year for the purpose of calculating interest cashflows. Other daycount conventions exist.

Weekend credit protection may be paid for at the close of the preceding Friday, i.e. protection buyers may pay for Saturday's and Sunday's protection at the end of the Friday. Further, where the next calendar day is not a trading day, protection for that day may be paid at the end of today—i.e. not only weekends, but also holidays.

The present embodiment may further provide for deducing the value of the underlying default swap. When defining the functional expression CDS with its operands to be (i) CDS (current credit spread, strike credit spread, swap rate, maturity) (3)

a generic formula may be used which has the property that its output is a number that is close to the clean present value of a credit default swap. There may be several such formulas which could be used in general. In the present embodiment, CDS is defined as follows:

$$CDS = \frac{(CS_{current} - CS_{initial}) \cdot (1 - e^{-(h+r)T})}{h + r} \quad (4)$$

In this equation,

1. $h = CS_{current} \cdot DCF/(1-\text{recovery})$ (5)

i. $r = \ln(1+S)$ (6)

As will be described below, the recovery rate in equation (5) may be used to initially determine the value of LGD.

Equation (4) provides a simple but accurate means of calculating the present value of a default swap. The derivation of this equation, and the meaning of the parameters in the equation, is provided in more detail below.

Discussing now the source of inputs, it may be only necessary to source the following inputs in order to calculate daily margin payments and value the futures contract: the average credit spread for the survived obligors in the index at the close of the day; the average credit spread for the survived obligors in the index at the close of the prior day; the average credit spread on the launch date of the futures contract; the swap rate for maturity T; and the number of obligors that suffered a credit event during the day. If T is an unquoted maturity, the swap rate may be obtained using a generally accepted interpolation technique.

The futures contract may further specify a means of provision of inputs. The swap rate may for instance be obtained from the ISDA swap fixing quoted on each trading day. Each day's average credit spread for the survived obligors may be determined either (i) by polling a number of leading credit derivative market markers, then eliminating bad data, or (ii) from well regarded credit derivative information providers, or (iii) through the price or spread behavior of the futures markets.

The determination of the type and date of credit events may be done by a respected independent party whose decision on whether a credit event has occurred on any day is then binding on all futures holders. Credit events may be announced after the close of trading on each credit day. The determination agent may either be a trade organisation, or a panel of leading banks and law firms, or a suitably qualified third party.

While the embodiment described above bases the contract valuation on a default swap which is calculated from an average spread, there may be further alternative embodiments. For instance, the valuation may be based on the sum of the time dependent values for each individual default swap. This will now be described in more detail.

In this embodiment, the futures contract is based on the total present value of N credit default swaps, where there is a credit default swap on each obligor in the index. The $i^{th}$ default swap may have notional equal to the total contract notional multiplied by $n_i$, where $n_i$ is the weight of the $i^{th}$ obligor in the index. The default swap may mature at a fixed date (e.g. 5 years) after the maturity of the futures contract.

Each credit default swap may be separately valued using the currently observable credit spread and the initial credit spread (observed at the futures launch date) of the relevant obligor.

Following a credit event on the $i^{th}$ obligor in the index, the default swap may pay a defined amount, $LGD \cdot n_i$. After this payment, the default swap linked to the defaulted obligor may be eliminated and may make no further contributions to futures cash flows for the remaining life of the future.

At the end of each day the protection buyer may pay for credit protection on each default swap that has not been eliminated, i.e. the payment for credit protection is not made if an obligor has defaulted. For each individual default swap the daily payment of premium may be derived from the initial credit spread of the relevant obligor on the futures launch date.

Given this embodiment, expression (1) reads as follows:

$$(i) \quad \sum [n_{i,today} \cdot CDS(CS_{i,today}, CS_{i,initial}, S_{today}, T_{today})] - \quad (1a)$$

$$(ii) \quad \sum [n_{i,yesterday} \cdot CDS(CS_{i,yesterday}, CS_{i,initial}, S_{today}, T_{today})] +$$

$$(iii) \quad \sum (n_i \cdot LGD_i)$$

In this expression, the first two summations are taken over the default swaps that have not suffered a credit event by the close of trading on the trading day. The third summation is taken over obligors that did suffer a credit event on the trading day. Further, (i) $n_i$ is the weight of the $i^{th}$ obligor;
(ii) $CS_{i,today}$ is the credit spread of the ith obligor at the end of the day;
(iii) $CS_{i,yesterday}$ is the credit spread of the ith obligor at the end of yesterday; and
(iv) $CS_{i,initial}$ is the credit spread of the ith obligor at the launch of the futures contract.

As with the first embodiment, for dates where there are no defaults the default payment is zero for that day. Such days were characterized by $N_{today} = N_{yesterday}$ in the first embodiment, and are characterized by $n_{i,today} = n_{i,yesterday}$ in the present embodiment. On such days, cash flows may only reflect the change in present value of the notional default swaps arising from the evolution of the individual credit spreads during the day.

Further, the futures contract notional may decay in the first embodiment by $n_i$ (for contracts with an initial notional size of one) after obligor i suffers a credit event. In the present embodiment, the summation over a default swap is not taken where the obligor has suffered a credit event. Therefore, the notional of the futures contract again effectively decays by $n_i$ (for contracts with an initial notional size of one) after obligor i suffers a credit event.

In the present embodiment, the daily premium payment made by the protection buyer (shown as expression (2) in the prior embodiment) is:

a. $\Sigma n_{i,today} \cdot CS_{i,initial} \cdot DC$ \quad (2a)

Again, the summation is only taken over default swaps that have not suffered a credit event by the close of that trading day.

Referring now to the sources of inputs described above, the present embodiment may require the following data: the credit spread for each of the survived obligors in the index at the close of the day; the credit spread for each of the survived obligors in the index at the close of the prior day; the credit spread for each obligor on the launch date of the futures contract; the swap rate for maturity T (where if T is an unquoted maturity, the swap rate will be obtained using a generally accepted interpolation technique); and the number and identity of obligors that suffered a credit event during the day.

Referring again back to the CDS expression (4) shown above, this replication formula may be derived as follows for all of the embodiments described above.

The clean price of a credit default swap can be accurately approximated by the following equation:

$$CDS = \frac{(CS_{current} - CS_{initial}) \cdot (1 - e^{-(h+r)T})}{h+r} \quad (7)$$

In this equation, h may be calculated by equation (5). In equations (4), (5) and (7), (i) $CS_{initial}$ is the credit spread on the date that the default swap was entered into or at the time the futures contract was listed;
(ii) $CS_{current}$ is the current credit spread used to value the credit default swap or futures contract;
(iii) recovery is the expected value (proportional to the par value) of the obligor's debt post credit event;
(iv) T is the remaining maturity of the default swap; and
(v) DCF is the daycount fraction for the default swap (for instance 365/360).

The value of r may be given by:

$$r = \begin{cases} \ln(1 + S_1) & \text{if the swap rate is quoted on an annual basis} \\ \ln(1 + S_2/2)^2 & \text{if the swap rate is quoted on a semi-annual basis} \end{cases} \quad (8)$$

where
(i) $S_1$ is the annually compounded swap rate for maturity T years; and
(ii) $S_2$ is the semi-annually compounded swap rate for maturity T years.

The CDS value according to equation (7) represents the present value of a credit default swap held by a buyer of protection where the credit spread moved from $CS_{initial}$ to $CS_{current}$ between the date that protection was bought and the valuation date. Alternatively, if the CDS value is negative, this is the amount that must be paid today by the buyer of protection to cancel the default swap.

It is to be noted that for the present value of CDS with T years remaining, paying a premium of $CS_{initial}$ with a current credit spread of $CS_{current}$ may be identical to the difference in present value between:

(ii) $CDS_i$ which is a bought protection CDS paying $CS_{initial}$ with maturity T; and (iii) $CDS_{ii}$ which is a sold protection CDS paying $CS_{current}$ with maturity T.

This is because $CDS_{ii}$ is the cost to hedge $CDS_i$. The net cash flows of i. $CDS_i - CDS_{ii}$ (9)

may consist of receiving an amount of

1. $(CS_{current} - CS_{intial}) \cdot (\text{daycount fraction})$ (10)

on each premium date, until the earlier of the CDS maturity or the default date. "Daycount fraction" in the above equation means the fraction of the year that the premium accrues for, e.g. if the premium is paid twice a year, "daycount fraction" would be 0.5. Regardless of the default date, default payments of (1−recovery) are hedged between $CDS_i$ and $CDS_{ii}$. In addition, on default the accrued premium due for the period starting on the prior premium date and ending on the default date must be paid by the buyer of protection to the seller of protection. Therefore, it may be assumed to be a good approximation to say that the credit spread differential is paid continuously.

The today's present value of the credit spread differential $\delta V$ that accrues between times t and t+$\delta$t, may be given by:

1. $\delta V = (CS_{current} - CS_{initial}) \cdot \delta t \cdot e^{-r \cdot t} \cdot PrS(t)$ (11)

In this equation, (iv) $(CS_{current} - CS_{initial}) \cdot \delta t$ is the cash flow due for the period of $\delta t$;

(v) PrS(t) is the probability of survival of the obligor until time t;

(vi) r is a constant interest rate which can be used to derive risk free discount factors that are appropriate for discounting cash flows occurring between t=0 and t=T;

(vii) $e^{-r \cdot t}$ is the risk free discount factor for time t assuming continuous discounting; and (viii) DCF is a daycount fraction, for instance 365/360.

PrS(t) may be given by

1. $PrS(t) = e^{-CS \cdot DCF \cdot t/(1-\text{recovery})} = e^{-h \cdot t}$ (12)

The result is then

1. $\delta V = (CS_{current} - CS_{intial}) \cdot e^{-(r+h) \cdot t} \cdot \delta t$ (13)

where h is given by equation (5).

Equation (13) gives the present value of the default swap that arises from the small unit of time between t and t+$\delta$t. The total value of the CDS may then be calculated by integrating $\delta V$ between the valuation date and the maturity of the CDS, i.e. over the time interval from 0 to T:

$$V = \int_0^T (CS_{current} - CS_{initial}) \cdot e^{-(r+h)t} dt \quad (14)$$

This equation leads to $$V = \frac{(CS_{current} - CS_{initial}) \cdot (1 - e^{-(r+h)T})}{h+r} \quad (15)$$

Noting that $e^{-r \cdot t}$ is a valid zero coupon risk free discount factor for $0 \leq t \leq T$, equation (15) provides a formula for the clean value of a CDS.

As will be described now, swap rates may be linked to zero coupon rates. In the discussion above, it was assumed that a constant interest rate r exists that can be used to derive risk-free discount factors that would be applicable between for times from t=0 to t=T. In an alternative embodiment, risk free interest rates are a function of t, i.e, r=r(t).

In this case, a constant value of r may be derived so that the equation (7) can be used without the need to consider the term structure of interest rates. This derivation may be done by considering swap rates.

Two bonds $B_1$ and $B_2$ may be exemplarily considered for this purpose:

$B_1$ pays continuously compounded (roughly means pays 1 day libor at the end of every day). At maturity T, $B_1$ pays the notional value N. It is to be noted that the present value of a bond paying libor coupons may be unaffected by the frequency with which the coupons are paid. Therefore, $B_1$ may have the same value regardless of whether coupons are paid daily, monthly, semi-annually or annually.

$B_2$ pays interest S on coupon dates $t_1, t_2 \ldots T$, and notional value N at maturity, T. It may be assumed that $t_{i+1} - t_i = t'$.

S may be the swap rate for maturity T when the value of the first bond $B_1$ equals the value of the second bond $B_2$. Considering the value of $B_1$ to be $$B_1 = \int_0^T r \cdot e^{-rt} dt + Ne^{-rT} \quad (16)$$

this can be written as $$B_1 = \int_0^{t_1} r \cdot e^{-rt} dt + \int_{t_1}^{t_2} r \cdot e^{-rt} dt + \int_{t_2}^{t_3} r \cdot e^{-rt} dt + \ldots + \int_{T-t'}^{T} r \cdot e^{-rt} dt + Ne^{-rT} \quad (17)$$

Carrying out the integration results in (i) $B_1 = (1 - e^{-r \cdot t'}) \cdot (1 + e^{-r \cdot t'} + e^{-2r \cdot t'} + \ldots + e^{-r \cdot (T-t')}) + Ne^{-rT}$ (18)

Similarly, the value of $B_2$ may be given by (i) $B_2 = (Se^{-r \cdot t'}) \cdot (1 + e^{-r \cdot t'} + e^{-2r \cdot t'} + \ldots + e^{-r \cdot (T-t')}) + Ne^{-rT}$ (19)

Setting $B_1 = B_2$ leads to a. $(1 - e^{-r \cdot t'}) = Se^{-r \cdot t'}$ (20)

In case t'=1, i.e. if S is quoted on an annual basis:

i. $r = \ln(1+S)$ (21)

In case t'=1/2, i.e. it S is the amount paid per semi-annual coupon date, and the quoted swap rate (quoted on an annualised basis) would be S'=2S, i. $r = \ln[(1+S'/2)^2]$ (22)

In general, the use of a time-independent parameter r to value the default swap may be assumed to be reasonably accurate. Accuracy may suffer when the risk free interest rate yield curve is not self-consistent within maturities from $0 \leq t \leq T$.

Referring now to the annexed tables, an example is given of how the above described embodiments can be used. It is to be noted that one way of implementing the invention is to use spreadsheet software that has been specifically programmed to calculate the daily margin payments. Other approaches are possible where dedicated software is developed to realize the technique of the embodiments.

In the tables, TAB. 1 shows calculation results according to a first embodiment where the default swap is calculated from an averaged spread. TAB. 2 is a table showing intermediary calculation results for obtaining the data of TAB. 1. TABs. 3 to 5 are corresponding tables according to a second embodiment where the default swap is calculated from a sum of the individual spread values.

Discussing first the embodiment of TABs. 1 and 2, the function of expression (3) may be realized by the following VISUAL BASIC® code:

```
(ix)    Function cds(creditspread As Double, strike As
        Double, recovery As Double, maturity As
        Double, swap As Double, daycount As String) As
        Double
(x)     'James Wood's formula
(xi)    Dim h, r, a, D, b As Double
(xii)   If daycount = "act360" Then D = 365 / 360
(xiii)  If daycount = "30360" Then D = 1
(xiv)   If daycount = "act365" Then D = 1
(xv)    r = Log(1 + swap)
(xvi)   h = (creditspread / (1 − recovery)) * D
(xvii)  a = (creditspread − strike) / (h + r)
(xviii) b = 1 − Exp(−(h + r) * maturity)
(xix)   cds = a * b
(xx)    End Function
```

It is to be noted that the embodiment is not limited to the use of the mentioned James Wood's formula. In other words, the CDS function may be any general function type that returns a value close to the clean present value of a default swap.

This function is a generic formula that has the property that its output is a close approximation to the clean present value of a credit default swap. The shown VISUAL BASIC® implementation have been used to obtain the data of TAB. 1.

The following item types may be distinguished when performing the calculation process of the present embodiment: inputs, input validity checks, variables (data), variables (formulae and processes), and outputs.

Examples of the input type are the date of current trading day, the credit spread for each obligor, and the swap rate quotes. The input validity check type may for instance be the check of swap maturities, and the check of summation of weights. Variables (data) are for example the recovery rate, the futures maturity, the contract notional, the daycount, the additional maturity of notional default swap (after maturity of futures contract), the maturities and the sources of swap rates that will be interpolated to calculate the exact swap rate, the number of obligors (which may be any integer equal to or greater than 1), and the weight of each obligor in the index. Variables (formulae and processes) may be the (e.g. linear) interpolation method used to calculate the swap rate, and the exact formula used to evaluate the CDS function. An example of an output is, e.g., the daily margin payment.

Thus, "input parameters" are parameters which the user may be obliged to provide on a day to day basis. "Variables", whether data or formulae/processes, relate to details/options relating to how the contract of the embodiments will finally be structured. The value of each variable would be determined in the contract documentation, i.e. on the launch date of the futures contract.

Referring now to TAB. 2, the righthand side of the table gives in the first line (or row) the identity of each obligor in the basket on the futures launch date. The number of obligors in the present sample basket is 100 though only nine of them are shown in TAB. 2. It is to be noted that in further embodiments, the number of obligors is a variable and may be adjusted to any positive integer value (including one). The corresponding weights of each obligor in the index are shown in the second line of TAB. 2. It is to be noted that the summation of all the weights is one.

In the table, the first column provides the trade date. The trade date may be filled in each day by the user. The trade date may be automatically be taken from TAB. 1. All data in each row is data that was observable on the date indicated in the first column.

The group of data on the right-hand side of the table gives the credit spreads for each obligor for each date, i.e. the respective data gives the credit spread observable on the respective trading date or the respective obligor with identity as shown in the first line of TAB. 2. On any date, input "d" instead of a credit spread indicates that an obligor suffered a credit event before the end of that date.

The table further indicates, for each trading day, the calculated weighted average credit spread for the obligors that had not suffered a credit event by the end of that date. Further, the calculated notional of the underlying default swap is provided for each trading day, based upon the number of defaults and the weights of each defaulted obligor.

In an automated approach such as a spreadsheet or dedicated software solution, the user fills in the input fields on each trading day for that day, i.e. credit spreads for each obligor in the basket and defaults, and the trading day. As described above, the trading day may be taken from TAB. 1. Consequently on a given date, the lines below will be blank.

The example of TABs. 1 and 2 has been based on the following parameters:

| | |
|---|---|
| Recovery rate | 40% |
| Maturity | 20 Dec. 03 |
| Contract notional | 10.000,00 |
| Daycount | Act360 |
| Post futures CDS maturity | 5 |
| DC | 0,002778 |

It is to be noted that all obligors may have the same assumed recovery rate, i.e. 40% in the present example. In another embodiment, the obligors may have different recovery rates.

Referring now again to TAB. 1 and the above shown table indicating the underlying parameters, the recovery rate built into the contract according to the embodiments may be used to calculate the defined payment received by the protection buyer following a credit event. For example, if the recovery rate is 40% in an index with 100 equally weighted names and total notional size €100, the amount paid following a credit event on one name will be €0.60.

The maturity of the futures contract is also provided, e.g. 20 Dec. 2003. The additional maturity of the underlying default swap, i.e. the maturity of the underlying default swap after the maturity of the futures contract, may for instance be equal to 5 years.

There are further provided the total notional of the contract, and the daycount fraction that is used in order to calculate the value of the function 'CDS' and for calculating the daily premium payment. In the present embodiment, the daycount may be set to 'act360', '30360' or 'act365' (see glossary and the visual basic example above). The DC value may be set to 1/360 if the daycount is 'act360' or '30360', or to 1/365 if the daycount is 'act365'.

In TAB. 1, the first column indicates the trade date. All dates in each line are data that were observable on, or relevant to, the respective trade date. The second column gives the calculated calendar days remaining before the future matures.

The columns "Swap rate 1", "Maturity 1", "Swap rate 2", and "Maturity 2" keep data permitting the calculation of the interpolated swap rate (a key model input). "Swap rate 1" is the quoted interest rate swap rate for the maturity given in "Maturity 1". "Swap rate 2" is the quoted interest rate swap rate for the maturity given in "Maturity 2". The exact method used to interpolate may be defined to be a variable and can be any generally accepted method such as linear interpolation or cubic splines. In the example of TAB. 1, linear interpolation was used. The table further includes a column containing a check that the swap rate maturities "Maturity 1" and "Maturity 2" are acceptable.

When implementing TABs. 1 and 2 as separate spreadsheets, TAB. 1 may include input fields allowing the spreadsheet outputs to be calculated without reference to the use of the spreadsheet of TAB. 2. This may apply in particular to the survived average credit spread and the survived notional for each trading day. Thus, the user may be allowed to input these two quantities, each as a single number, directly. The survived average credit spread and the survived notional for each trading day may therefore be fed into the cash flow calculations, either taking as inputs the information in TAB. 1 or TAB. 2.

The survived notional may be defined to be the summation of weights of the obligors in the index that have not suffered a credit event by the end of the respective date. The summation may be in the same units as the summation of the original index weights. $\Delta N$ gives the decrease in survived notional that occurred on any trading day, due to the occurrence of a credit event.

The columns "Present value from change in credit spreads", "Default payment", and "Premium payment" provide three components of the daily cash flow. Each component of present value may be based on the contract notional, see table above. "Present value from change in credit spreads" is the present value of the underlying default swap that arises because the average credit spread currently observed differs from the initial average credit spread. This value may be calculated as follows:

i. $N_{today} \cdot CDS(CS_{average,today}, CS_{average,initial}, S_{today}, M_{today})$ (23)

"Default payment" is the default cash flow, paid at the end of a day on any names that suffered a credit event on that day. These values may be calculated as follows (where the summation is taken over all obligors that suffered a credit event on that trading day):

i. $\Sigma(n_i \cdot LGD_i)$ (24)

"Premium payment" is the payment made by the protection buyer for credit protection on the respective day. The protection payment may only be applied to names that had not defaulted by the close of trading day. For one day, the premium payment may be calculated as follows:

(i) $N_{today} \cdot CS_{yesterday} \cdot 1/360$ if the daycount is act360 or 30360 (25)

or (ii) $N_{today} \cdot CS_{yesterday} \cdot 1/365$ if the daycount is act365. (26)

If the number of days between the current trading date and the next trading date is greater than or equal to two (i.e. there is a weekend and/or bank holiday), the protection payment for the weekend and/or bank holiday period may be paid by the protection buyer at the close of today, in addition to the premium payment for today. For example, on a Friday evening the protection seller may pay for three days of protection: Friday, Saturday and Sunday.

The "Daily margin" column gives the net daily payment from the perspective of a receipt by the protection buyer. This amount is received by the protection buyer if positive or paid by the protection buyer if negative. This value is calculated as:

$$(i) \quad \text{default margin} = \text{present value of today} - \text{present value of last trading day} + \text{default payment} - \text{premium payment} \quad (27)$$

The last column shows the total of the daily cash flows received by the protection buyer since the start of the futures contract.

Turning now to the embodiment of TABs. 3 to 5 where the default swap is calculated from a sum of the individual spread values, the function of expression (3) may be realized by the following VISUAL BASIC® code:

```
(xxi)    Function cds(creditspread As Double, strike As
         Double, recovery As Double, maturity As
         Double, swap As Double, daycount As String) As
         Double
(xxii)   'James Wood's formula
(xxiii)     Dim h, r, a, D, b As Double
(xxiv)   If daycount = "act360" Then D = 365 / 360
(xxv)    If daycount = "30360" Then D = 1
(xxvi)   If daycount = "act365" Then D = 1
(xxvii)     r = Log(1 + swap)
(xxviii)    h = (creditspread / (1 - recovery)) * D
(xxix)   a = (creditspread - strike) / (h + r)
(xxx)    b = 1 - Exp(-(h + r) * maturity)
(xxxxi) cds = a * b
(xxxii) End Function
```

It is to be noted that the embodiment is not limited to the use of the mentioned James Wood's formula. In other words, the CDS function may be any general function type that returns a value close to the clean present value of a default swap.

The example of TABs. 3 to 5 has been based on the same parameters as indicated above.

Referring now first to TABs. 3 and 5, these tables mainly correspond to TABs. 1 and 2 of the first embodiment. However, TAB. 5 contains a column "Survived initial premium" holding the calculated survived initial premium for each trading day, i.e. the premium due to default swaps where obligors have not suffered a credit event prior to the end of that date. The column "N(today)" contains the calculated total surviving weight for each trading day, i.e. the total weight due to default swaps where obligors have not suffered a credit event prior to the end of that date.

This data corresponds to the column "Total survived weight (N)" in TAB. 3. The total survived weight is the summation of weights of the obligors in the index that have not suffered a credit event by the end of the respective trading date. The summation may be in the same units as the summation of the original index weights. Column "$\Delta N$" gives the decrease in survived notional that occurred on any trading day, due to the occurrence of a credit event.

The columns "Present value from change in credit spreads", "Default payment", and "Premium payment" give the three components of the daily cash flow. Each component of present value is based on the contract notional, as shown in the parameters table above. The "Present value from change in credit spreads" is the total present value of the underlying default swaps (that have not suffered a credit event) that arises because credit spreads currently observed differ from initial credit spreads. This value is calculated as follows:

i. $\Sigma n_{i,today} \cdot CDS\ (CS_{i,today}, CS_{i,initial}, S_{today}, M_{today})$  (28)

The value is set equal to the sum of the underlying CDS values of the group shown in each line of TAB. 4. Each cell in this group calculates the clean present value of one of the underlying default swaps, on the respective trading day. For example, the clean present value of the default swap on the $1^{st}$ obligor on 24.06.03 is 4.43. For days/obligors where a credit event has taken place, the value of the credit default swap in the line of TAB. 4 is set to zero.

The "Default payment" is the default cash flow, paid at the end of a day on any names that suffered a credit event on that day. The value is calculated as follows (where the summation is taken over all obligors that suffered a credit event on that day):

i. $\Sigma(n_i \cdot LGD_i)$  (29)

The "Premium payment" is the payment made by the protection buyer for credit protection on the respective day. The protection payment is only applied to names that had not defaulted by the close of trading day. For one day, the value is calculated as follows:

a. $\Sigma n_{i,today} \cdot CS_{i,initial} \cdot DC$  (30)

where DC=1/360 if the daycount is act360 or 30360, or 1/365 if the daycount is act365.

In the following, two intra-day examples are provided showing how the invention can be used in the process of daily trading.

In the first example, a market participant buys protection at 10 am when the weighted average index spread is 105 bp, then sells protection at 3 pm when the weighted average index spread is 110 bp. No defaults have taken place.

Tonight's margin (10 am-3 pm) is given as follows.

The margin payment received by the buyer of protection at the end of that trading day is €22.91.

This sum is comprised of:

|  | € |
|---|---|
| Present value closing trade of default swap at 3 pm @110 bp | 45.91 |
| Less initial present value opening trade of default swap at 10 am @105 bp | (23) |
| Premium payment | 0 |
| Default payment | 0 |

The opening and closing present values are calculated using the CDS formula.

The premium is zero because the position is not held overnight (premium is only paid where the protection buyer holds protection overnight). The default payment is zero because (a) there is no default on that day and (b) even if there was, default payments are only paid to protection buyers that hold a futures position overnight.

In the second example, a market participant bought protection at 10 am yesterday when the weighted average index spread is 105 bp, then sells protection at 3 pm today when the weighted average index spread is 110 bp. Yesterday's closing credit spread was 111 bp. No defaults have taken place.

Discussing first the yesterday's margin (at close). The margin payment received by the buyer of protection on yesterday's close was €27.20.

This sum is comprised of:

|  | € |
|---|---|
| Present value settlement of default swap at close @111 bp | 50.48 |
| Less initial present value opening trade of default swap at 10 am @105 bp | (23) |
| Premium payment | (0.2778) |
| Default payment | 0 |

The opening and settling present values are calculated using the CDS formula. The premium is not zero because the position was held overnight (premium is only paid where the protection buyer holds protection overnight). The default payment is zero because there was no default on that day.

For today's margin (yesterday's close to 3 pm today), the margin payment received by the buyer of protection at today's close was −€4.59.

This sum is comprised of:

|  | € |
|---|---|
| Present value closing trade of default swap at 3 pm @110 bp | 45.89 |
| Less present value settlement of default swap at yesterday's close @111 bp | (50.48) |
| Premium payment | 0 |
| Default payment | 0 |

The settling and closing present values are calculated using the CDS formula.

The premium is zero because the position is not held overnight (premium is only paid where the protection buyer holds protection overnight). The default payment is zero because (a) there is no default on that day and (b) even if there was, default payments are only paid to/levied from users that hold a futures position overnight.

Given the above described embodiments, an advantageous technique is provided that greatly improves over the prior art approaches. Credit spreads, which are the most important input to the valuation formula for the underlying default swap, evolve rapidly and continuously. The complexity of the valuation formula for the underlying default swap means that the calculation of the present value could not be carried out in the prior art by hand in a short enough time that credit spreads did not move. Furthermore, as in the first embodiment, one input to the valuation calculation is the average credit spread of an index of (potentially a high number of) obligors where constituents may have different weightings, such that it would be impossible to calculate by hand the average credit spread in a time short enough that credit spread did not move. The embodiments allow to calculating the underlying default swap's present value in a time that is short enough that credit spreads do not move.

As mentioned earlier, the described embodiments relate to futures contracts that are based on baskets of credit default swaps as underlyings, but the invention generally relates to a data processing system and method for repetitively determining a resource amount for counterbalancing the transfer of a failure risk pertaining to a bundle of constructs that may individually fail.

In the context of credit default swap baskets, a construct may be considered to be a credit default swap, a bundle to be a basket, a failure risk to be the credit risk, and a resource amount to be a premium payment and/or a default payment and/or a present value.

When defining spread values to indicate the difference between a continuously updated value of the respective construct and a continuously updated value of a reference construct (for instance in the context of the first embodiment), a reference construct specifies a single CDS with specific characteristics, which may be the basis for the calculations by software. The software then needs a reference CDS to perform the present value calculation, the premium calculation and default payment calculation. The variables of the reference CDS may be fed into a spreadsheet, being initial spread, recovery rate, expiry of the contract, CDS maturity, contract nominal, and daycount day count convention.

The credit spread used may be a weighted average credit spread, calculated based on the spreads and weights of each obligor in the index. This does not in general net change the definition of the construct (it only changes the value of one of the inputs to the construct). All subsequent calculations may be dependent on the prior definition of the reference CDS at the point of listing the contract.

When defining spread values to indicate the difference between continuously updated values of the respective constructs and the continuously updated values of a reference bundle of constructs (for instance, in the context of the second embodiment), a reference bundle of constructs specifies a basket of CDS with specific characteristics, which may be the basis for the calculations by software. The software then needs a reference basket of CDS to perform the present value calculation, the premium calculation and default payment calculation. The variables of the reference basket of CDS may be fed into a spreadsheet, being initial spreads, obligors, weighting of the obligors, recovery rates, expiry of the contract, CDS maturity, contract nominal, and day count convention. All subsequent calculations may be dependent on the prior definition of a reference basket CDS at the point of listing the contract.

As mentioned above, a resource amount may be a premium payment and/or a default payment and/or a present value. That is, the resource amount is a value/price to compensate for the transfer of default risk from protection buyer to protection seller, for instance:

Premium payments are based on the initially set spread (compare with initial spread in reference bundle of constructs). This embodiment is calculating the premium payments on a daily basis, taking into consideration holidays and weekends.

Default payments are based on the weighting of the obligor and the LGD value for defaulted obligors. The LGD value itself is defined as (100% minus recovery rate), while the recovery rate in this embodiment might be a predefined variable of the reference construct (first embodiment discussed above) or reference bundle of constructs (second embodiment discussed above). This technique is calculating the exact LGD payment depending on stipulating a credit event and weighting of the defaulted obligor as a one off payment.

Present value expresses the compensation for spread changes. The present value may always be based on the comparisons of the spread (first embodiment discussed above) or spreads (second embodiment discussed above) which were agreed for the reference construct or reference bundle of constructs, respectively, and the current spread: i.e. in the first case the weighted average credit spread based on the individual obligor credit spreads which are currently paid for the obligors in the index; in the second case, the current credit spread for each individual obligor that is currently paid in the market. The present value of the reference basket of CDS can be continuously calculated which is the basis for all margin calculations.

Describing now generally and in more detail how the initial LGD value is determined, i.e. how the recovery rate in equation (5) is defined, the following three approaches are embodiments of the invention.

In one embodiment, LGD is a fixed amount that is the same for each and every obligor. This amount may either be determined arbitrarily, or by reference to a dealer poll of LGDs for each of the individual obligors in the index (e.g. taking a weighted average of answers from the dealer poll). In this embodiment, the default payment may be determined by reference to this standard fixed LGD number.

In another embodiment, LGD is different for each obligor and is determined on the first day by reference to a dealer poll (or other mechanism). When equation (5) is applied to the first embodiment where average spreads are used, 'recovery' means the 1–(weighted average LGD for each obligor in the index). When following this approach, the default payment may be determined by reference to the initially fixed LGD for the defaulted obligor, where LGDs differ between each obligor.

In a third approach, an embodiment is provided where LGD is again different for each obligor and is determined on the first day by reference to a dealer poll (or other mechanism). However, the weighted average LGD changes as obligors default. I.e, when equation (5) is applied to the first embodiment where average spreads are used, 'recovery' means the 1—(weighted average LGD for each obligor in the index that has survived at the time of calculation). The default payment may be re-determined after the default by reference to some other means, e.g. a dealer poll.

In the first (i.e. the "average spread") embodiment discussed above, where an average spread is used, the term "average spread" may be considered to describe an arithmetically weighted average of single obligor credit spreads. The average spread is based on the non-defaulted names. The average spread might be calculated by software (if the spreads and weighting of the single obligors are available) or the average spread might be observed as a single number in the market (e.g. via an index or a fixing of the average spread). In an embodiment, both possibilities are implemented in one and the same technique.

When discussing events in the above techniques, the terms "event" or "failure event" may be considered to describe a credit event, whilst where there are different credit events defined in the market (e.g. bankruptcy, failure to pay, restructuring etc.). An obligor has either experienced a credit event or not for the purpose of the product.

In the first embodiment discussed above, depending on that information a one off default payment may be triggered and the nominal of the contract may be reduced by the weighting factor of the defaulted obligor for the remaining life time of the contract. The reference construct is then not disregarded as there is only one CDS.

In the second embodiment discussed above, a one off default payment may be triggered, calculated based on the weight for the defaulted CDS and the fixed LGD payment. Then the individual defaulted CDS may be disregarded.

As described above, the embodiments may use weights. In the first embodiment discussed above, "weights" may be understood to be weighting factors of obligors relevant for determining average credit spread and the nominal. Each obligor in the index may have its own weight. Software can deal with equal and non-equal weighted baskets. The weighting could also be 100%, basically representing a single name CDS. In the second embodiment discussed above, "weights" may be understood to be weighting factors of each CDS in the CDS basket. Again, software can deal with equal and non-equal weighted baskets. The weighting could also be 100%, basically representing a single name CDS.

The following is a glossary of terms which may be used to better understand the invention.

A "30/360 daycount basis" assumes that there are 360 days in a year and 30 days in each month.

"ACT/360" is a day count convention used for many bonds and default swaps.

"Arbitrage" is the act of simultaneously buying and selling of very similar financial instruments in different markets in order to profit from short-term price differences between those markets.

An "asset swap" is the combination of the purchase of a fixed-rate bond together with an interest rate swap where the fixed rates are paid (and the fixed rate is the scheduled coupons of the purchased bond) and floating rates are received.

A "basis point" is 0.01 percent, usually of an interest rate or a credit spread.

A "Binary default swap" is a credit default swap where the amount paid by the protection seller following a credit event is fixed and is not a function of the recovery rate of the reference obligation after the credit event.

"Bootstrapping" is a recursive process by which future interest rates can be calculated from earlier interest rates. For example, bootstrapping may be used to determine the zero coupon rate from a known yield curve for successive points in time.

"Cash settlement" is the process in which traders receive or pay the losses or gains on a futures contract in cash. Cash settlement is an alternative to the physical delivery of the goods specified in the futures contract.

A "clean function" is a bond or default swap valuation which excludes accrued interest. Accrued interest is interest owed but not yet paid for the historic period between the last coupon date and the valuation date.

The "clean price" is the price of a bond or default swap, excluding accrued interest.

A "clearing agent" or a "clearinghouse" is a type of exchange where transactions between brokers are executed.

A "contract specification" is the exact parameters (including pricing models and inputs, if any) of any futures contract.

A "corporate bond" is a debt obligation of a corporate issuer. The investor in the corporate bond bears the risk that the corporation might default on the payment obligation.

A "credit default swap" is a contract where the protection seller agrees to purchase from the protection buyer an obligation issued by a reference entity for its par value after the occurrence of a credit event. In return, the protection buyer agrees to pay a premium to the protection seller until the earlier of the maturity of the credit default swap and the date of a credit event.

A "credit derivative" is a financial instrument that enables the isolation and separate transfer of credit risk. Credit derivatives have credit contingent payoffs that are only triggered following a credit event. For example in a credit default swap, after a credit event, the protection seller buys a defaulted bond from the protection buyer for its par value.

A "credit event" is an event that triggers the credit contingent payment of a credit derivative. Standardized credit events are commonly traded and include: bankruptcy, failure to pay, obligation default, obligation acceleration, repudiation/moratorium and restructuring.

The "credit event announcement time" is the time after the close of trading each day when the exchange formally announces credit events deemed to have occurred.

A "credit spread" is the difference (usually quoted in basis points) between the yield on a reference obligation and the yield on the equivalent risk-free debt instruments of the same maturity.

A "counterparty" is one of two parties to an agreement. If two parties agree to something, they are each a counterparty to the agreement, and they may both be collectively referred to as the counterparties to the agreement. The terms agreement and contract may be used synonymously.

A "coupon" is a statement of interest owed that may be detached from a bond and separately redeemed at a specified time.

"Discount factors" are numbers derived from a zero coupon curve that are used to determine the present value of one or more cash flows. Thus, a discount factor $d_i$ is the present value of $1 received in the future at time i.

The "discount rate" is the rate used to calculate the present value of future cash flows. Typically, the discount rate accounts for at least the interest that could be obtained in a relatively risk free investment, such as a Treasury bill.

The "effective date" is the date and time at which parties have previously agreed to cash settle a futures contract.

"Equilibrium zero rates" are zero rates derived from the midpoint between bid and asked quotes for a yield curve.

The "European Interbank Offered Rate" (EURIBOR) is a short term interest rate at which banks are willing to lend funds to other banks in the interbank market. EURIBOR interest rates are determined by a group of banks located in Europe.

An "exchange" is an organization that brings together buyers and sellers of particular assets. Typically, the exchange makes rules that govern participation and trading.

"Forward interest rates" are the interest rates fixed today on loans to be made at corresponding future dates.

A "future" is a standardized contract that is bought or sold, respectively, for future acceptance or delivery. It is also possible to cash settle futures contracts by reference to the fixing value of the underlying financial instrument on the futures expiry date.

A "future time period" is a date and time that has not yet occurred.

A "futures contract" is an agreement to buy or sell a financial instrument on a future date at a price that is fixed today.

A "futures exchange" is an organization that brings together buyers and sellers of futures contracts.

The "futures price" of an asset is the price of an asset today for delivery in the future.

"To hedge" is to invest in a first asset to reduce the risk associated with a second asset. Generally, the value of the first and second assets are related inversely, so that when the value of the first asset decreases, the value of the second assets increases, and vice versa. A perfect hedge results when the two sides of a hedge move together in exactly the same proportion.

A "hedge ratio" or "delta" is the number of units of an asset needed to hedge one unit of a liability.

The "implied zero curve" is a zero coupon curve derived from a coupon or swap curve.

"Interest rate risk" is the potential monetary gain or loss on a financial instrument if interest rates changed from their current value.

The "International Money Market" (IMM) is the financial futures market within the Chicago Mercantile Exchange.

"ISDA" is the International Swaps and Derivatives Association, the trade organization for the credit derivatives industry.

The "London Interbank Offered Rate" (LIBOR) is a short term interest rate at which banks are willing to lend funds to other banks in the interbank market.

A "long position" is a position which has been purchased for value, as opposed to a position which has been sold.

"Loss given default" ("LGD") is the amount paid by a protection seller to a protection buyer in a credit default swap after a credit event occurs. Loss given default is defined as a loss on a reference debt instrument, usually given as the par value less the recovery rate of the reference debt instrument observed after the credit event in the bond market. In addition, loss given default can be defined to be a binary amount so that a fixed amount is paid out after a credit event regardless of the actual post credit event recovery rate.

"Margin" is the amount of money that an exchange requires as deposit in order for a dealer to maintain an account.

"Margining" is the practice of maintaining a minimum margin with an exchange. For example, if the account of the first dealer has decreased by $10,000 from the previous time period in which margining occurred, the dealer pays the entity that oversees trading $10,000. For most futures contracts, margining occurs daily after the close of trading because the contracts are marked-to-market.

"Marking to market" is the practice of calculating the profits and losses on a contract at the end of each day and settling up between the exchange and the dealers. Most, if not all, futures contracts are marked-to-market. Marking to market is also called daily settlement.

"Maturity" is the date and time at which the obligation represented by a financial instrument terminates. For example, a 10 year bond issued today matures 10 years from today.

The "net preset value" (NPV) of an investment is the sum of the present value of all cash flows resulting from an investment.

"Netting" is the act of offsetting credit exposure between financial institutions.

Netting is also the process by which multiple obligations between parties are offset against one another to reduce (and minimize, if possible) the number of transactions required to fulfill the multiple obligations. For example, if a first dealer owes the second dealer $100, and the third dealer owes the first dealer $100, both obligations are netted by a single payment of $100 from the third dealer to the second dealer.

"Over-the-counter" (OTC) is an informal market that does not involve a futures exchange.

"To pay fixed" means to pay a fixed interest rate, usually as part of an interest rate swap.

The "present value" (PV) is the value of a future sum of money today, based on a particular discount rate.

A "protection buyer" is a credit derivative user that wishes to reduce credit risk exposure to a specific reference entity and pays a counterparty to do so.

A "protection seller" is a credit derivative user that is willing to take on additional credit risk of a specific reference entity in return for an appropriate fee.

The "recovery rate" is the proportion of face value of debt that an investor would be able to recover (either through sale of the debt or through the liquidation process) following a credit event.

The "reference entity" is the issuer of the debt obligations referenced in a credit derivative trade.

The "repo rate" is the interest rate applicable to principal amount loaned as a result of a repurchase agreement.

A "repurchase agreement" or "repo" is a short-term loan agreement by which one party sells an asset to another party, but promises to buy back the asset at a specified time.

"Selling short" is the process of making a short sale.

A "short sale" is the sale of an asset that an investor does not own. The investor is obligated to buy the same amount of the asset that was sold short at a later date.

"Shorting" is the act of selling an asset which one does not own at the time of sale.

"Spread" refers to an observable market price for the isolated credit risk of a defined obligor expressed in yield basis points (credit spread).

"Survived" refers to names in the index that have not suffered a credit event on or in the time prior to a valuation date.

"Stub calculations" are interest calculations relating to the period of time either before or after a defined date.

The "three month LIBOR rate" is the LIBOR rate for a three month loan. If a counterparty to an IRS pays floating interest based on the three month LIBOR rate, that counterparty makes an interest payment every three months, the amount of which is determined by multiplying the then current three month LIBOR rate by the notional amount.

"Trading desks" are the places where traders send and receive information and execute trades.

A "transparent" price describes a price derived from standardized terms and a single pricing model that is generally applicable to all circumstances.

A "Treasury" is a debt issued by the U.S. government. "Treasury bills" mature in less than a year, "Treasury notes" mature from one year to under 10 years, and "Treasury bonds" take 10 or more years to mature.

"Treasury accrued interest" is the accrued interest on a Treasury bond for a period of time.

"Values" may be the values of any data, which could be spreads, weights, or credit events. Those variables might be fixed parameters for calculation purposes or might change over time. A value could also be a result of a calculation.

"Variation margin" is the payment due to or from an exchange (usually made each trading day) as a result of the change in value of a exchange traded contract.

A "yield" is a profit expressed as a percentage of the investment made to achieve that profit. If a $100 investment pays $106 in a year, the annual yield is 6%.

A "yield curve" is the relationship between future interest rates and time. A graph showing the interest yield of securities displaying the same characteristics as government securities is known as a par coupon yield curve. The U.S. Treasury yield curve is an example of a par coupon yield curve.

The "yield spread" is the difference in yield between two fixed income instruments.

A "zero-coupon bond" does not pay interest at periodic intervals; rather, it is issued at a discount from its par (or face) value and is redeemed at par. For example, a bond that costs $60, pays no interest, but is redeemable for $100 in 20 years, is a zero-coupon bond.

The "zero coupon discount factor" is the discount factor for a zero coupon bond.

The "zero-coupon rate" is the yield on a zero-coupon bond. All coupon bonds has an equivalent zero-coupon rate that is equal to the yield of a zero coupon bond having an NPV equal to the coupon bond.

The "zero-coupon yield curve" or "zero coupon curve" is a graph or relationship of the internal rate of return of zero-coupon bonds over a range of maturities.

"Zero rates" are zero coupon rates, usually derived from a par coupon curve, that are used to determine discount factors.

While the invention has been described with respect to the physical embodiments constructed in accordance therewith, it will be apparent to those skilled in the art that various modifications, variations and improvements of the present invention may be made in the light of the above teachings and within the purview of the appended claims without departing from the scope of the invention.

For instance, while binary payments were mentioned when describing embodiments, this should not be construed to exclude the additional or alternative possibility to have non-binary payments.

In addition, those areas in which it is believed that those of ordinary skill in the art are familiar have not been described herein in order to not unnecessarily obscure the invention described herein. Accordingly, it is to be understood that the invention is not to be limited by the specific illustrative embodiments, but only by the scope of the appended claims.

TABLE 1

| Date | Futures days remaining | Swap rate 1 | Maturity 1 | Swap rate 2 | Maturity 2 | Swap maturity check | Interpolated swap rate | Average credit spread |
|---|---|---|---|---|---|---|---|---|
| 20.06.03 | 183.00 | 4.75% | 5.00 | 5% | 6.00 | OK | 4.8753% | 1.000% |
| 23.06.03 | 180.00 | 4.75% | 5.00 | 5% | 6.00 | OK | 4.8733% | 1.005% |
| 24.06.03 | 179.00 | 4.75% | 5.00 | 5% | 6.00 | OK | 4.8726% | 1.017% |
| 25.06.03 | 178.00 | 4.75% | 5.00 | 5% | 6.00 | OK | 4.8719% | 1.025% |
| 26.06.03 | 177.00 | 4.75% | 5.00 | 5% | 6.00 | OK | 4.8712% | 1.036% |
| 27.06.03 | 176.00 | 4.75% | 5.00 | 5% | 6.00 | OK | 4.8705% | 1.035% |
| 30.06.03 | 173.00 | 4.75% | 5.00 | 5% | 6.00 | OK | 4.8685% | 1.053% |
| 01.07.03 | 172.00 | 4.75% | 5.00 | 5% | 6.00 | OK | 4.8678% | 1.048% |
| 02.07.03 | 171.00 | 4.75% | 5.00 | 5% | 6.00 | OK | 4.8671% | 1.046% |
| 03.07.03 | 170.00 | 4.75% | 5.00 | 5% | 6.00 | OK | 4.8664% | 1.061% |
| 04.07.03 | 169.00 | 4.75% | 5.00 | 5% | 6.00 | OK | 4.8658% | 1.069% |
| 07.07.03 | 166.00 | 4.75% | 5.00 | 5% | 6.00 | OK | 4.8637% | 1.081% |
| 08.07.03 | 165.00 | 4.75% | 5.00 | 5% | 6.00 | OK | 4.8630% | 1.099% |
| 09.07.03 | 164.00 | 4.75% | 5.00 | 5% | 6.00 | OK | 4.8623% | 1.101% |
| 10.07.03 | 163.00 | 4.75% | 5.00 | 5% | 6.00 | OK | 4.8616% | 1.156% |
| 11.07.03 | 162.00 | 4.75% | 5.00 | 5% | 6.00 | OK | 4.8610% | 1.154% |
| 14.07.03 | 159.00 | 4.75% | 5.00 | 5% | 6.00 | OK | 4.8589% | 1.155% |
| 15.07.03 | 158.00 | 4.75% | 5.00 | 5% | 6.00 | OK | 4.8582% | 1.163% |
| 16.07.03 | 157.00 | 4.75% | 5.00 | 5% | 6.00 | OK | 4.8575% | 1.029% |
| 17.07.03 | 156.00 | 4.75% | 5.00 | 5% | 6.00 | OK | 4.8568% | 1.000% |
| 18.07.03 | 155.00 | 4.75% | 5.00 | 5% | 6.00 | OK | 4.8562% | 1.021% |

| Date | Total survived weight (N) | ΔN | Present value from change in credit spreads | Default payment | Premium payment | Daily margin | Running total |
|---|---|---|---|---|---|---|---|
| 20.06.03 | 100.00% |  | 0.00 |  |  |  |  |
| 23.06.03 | 100.00% | 0.00% | 2.54 | 0.00 | 0.2778 | 2.2577 | 2.2577 |
| 24.06.03 | 100.00% | 0.00% | 8.06 | 0.00 | 0.2778 | 5.2504 | 7.5081 |
| 25.06.03 | 100.00% | 0.00% | 11.75 | 0.00 | 0.2778 | 3.4042 | 10.9123 |
| 26.06.03 | 100.00% | 0.00% | 16.83 | 0.00 | 0.2778 | 4.8059 | 15.7182 |
| 27.06.03 | 100.00% | 0.00% | 16.26 | 0.00 | 0.8333 | −1.4071 | 14.3111 |
| 30.06.03 | 100.00% | 0.00% | 24.58 | 0.00 | 0.2778 | 8.0472 | 22.3583 |
| 01.07.03 | 100.00% | 0.00% | 21.93 | 0.00 | 0.2778 | −2.9253 | 19.4330 |
| 02.07.03 | 100.00% | 0.00% | 21.36 | 0.00 | 0.2778 | −0.8479 | 18.5851 |
| 03.07.03 | 100.00% | 0.00% | 28.03 | 0.00 | 0.2778 | 6.3903 | 24.9754 |
| 04.07.03 | 100.00% | 0.00% | 31.76 | 0.00 | 0.8333 | 2.8991 | 27.8745 |
| 07.07.03 | 100.00% | 0.00% | 36.98 | 0.00 | 0.2778 | 4.9354 | 32.8100 |
| 08.07.03 | 100.00% | 0.00% | 45.22 | 0.00 | 0.2778 | 7.9640 | 40.7739 |
| 09.07.03 | 100.00% | 0.00% | 46.19 | 0.00 | 0.2778 | 0.6962 | 41.4702 |
| 10.07.03 | 100.00% | 0.00% | 71.04 | 0.00 | 0.2778 | 24.5739 | 66.0440 |
| 11.07.03 | 100.00% | 0.00% | 70.13 | 0.00 | 0.8333 | −1.7425 | 64.3015 |
| 14.07.03 | 100.00% | 0.00% | 70.69 | 0.00 | 0.2778 | 0.2791 | 64.5806 |
| 15.07.03 | 100.00% | 0.00% | 74.01 | 0.00 | 0.2778 | 3.0442 | 67.6248 |
| 16.07.03 | 99.00% | 1.00% | 13.34 | 60.00 | 0.2750 | −0.9493 | 66.6755 |
| 17.07.03 | 99.00% | 0.00% | 0.22 | 0.00 | 0.2750 | −13.3935 | 53.2820 |
| 18.07.03 | 99.00% | 0.00% | 9.64 | 0.00 | 0.8250 | 8.5931 | 61.8751 |

TABLE 2

| Trading days | N(today) | Weighted average credit spread | Obligor: 1 | 2 | 3 | 4 | 5 | 6 | 7 | 8 | 9 |
|---|---|---|---|---|---|---|---|---|---|---|---|
| | | | Weights: | | | | | | | | |
| | | | 1.00% | 1.00% | 1.00% | 1.00% | 1.00% | 1.00% | 1.00% | 1.00% | 1.00% |
| 20.06.03 | 100.00% | 1.00% | 1.00% | 1.00% | 1.00% | 1.00% | 1.00% | 1.00% | 1.00% | 1.00% | 1.00% |
| 23.06.03 | 100.00% | 1.01% | 1.06% | 0.97% | 1.05% | 0.83% | 1.06% | 1.06% | 0.80% | 1.01% | 1.17% |
| 24.06.03 | 100.00% | 1.02% | 1.05% | 1.11% | 1.21% | 0.82% | 1.11% | 1.06% | 0.84% | 1.14% | 0.99% |
| 25.06.03 | 100.00% | 1.03% | 2.00% | 1.07% | 1.30% | 0.91% | 0.94% | 1.03% | 0.87% | 1.22% | 0.95% |
| 26.06.03 | 100.00% | 1.04% | 3.00% | 0.87% | 1.56% | 0.99% | 1.00% | 1.17% | 0.89% | 1.20% | 0.93% |
| 27.06.03 | 100.00% | 1.04% | 4.00% | 0.95% | 1.43% | 1.00% | 0.90% | 1.16% | 0.82% | 1.38% | 1.01% |
| 30.06.03 | 100.00% | 1.05% | 5.00% | 0.82% | 1.61% | 1.13% | 0.91% | 1.25% | 0.86% | 1.52% | 114% |
| 01.07.03 | 100.00% | 1.05% | 6.00% | 0.77% | 1.37% | 1.14% | 0.95% | 1.25% | 0.95% | 1.36% | 1.00% |
| 02.07.03 | 100.00% | 1.05% | 7.00% | 0.78% | 1.21% | 1.11% | 1.15% | 1.10% | 1.03% | 1.39% | 0.93% |
| 03.07.03 | 100.00% | 1.06% | 8.00% | 0.73% | 1.25% | 1.30% | 1.08% | 1.15% | 0.86% | 1.31% | 0.99% |
| 04.07.03 | 100.00% | 1.07% | 9.00% | 0.70% | 1.34% | 1.44% | 1.05% | 0.91% | 1.02% | 1.29% | 1.01% |
| 07.07.03 | 100.00% | 1.08% | 10.00% | 0.64% | 1.26% | 1.62% | 1.03% | 0.91% | 0.90% | 1.33% | 0.86% |
| 08.07.03 | 100.00% | 1.10% | 11.00% | 0.70% | 1.13% | 1.66% | 1.01% | 0.97% | 0.70% | 1.53% | 0.75% |
| 09.07.03 | 100.00% | 1.10% | 12.00% | 0.66% | 0.85% | 2.14% | 1.08% | 0.79% | 0.73% | 1.55% | 0.81% |
| 10.07.03 | 100.00% | 1.16% | 15.00% | 0.69% | 0.91% | 1.88% | 0.98% | 0.77% | 0.72% | 1.60% | 0.77% |
| 11.07.03 | 100.00% | 1.15% | 15.00% | 0.64% | 1.09% | 1.77% | 0.83% | 0.80% | 0.70% | 1.65% | 0.97% |
| 14.07.03 | 100.00% | 1.16% | 15.00% | 0.74% | 0.93% | 1.52% | 1.04% | 0.80% | 0.69% | 1.76% | 0.98% |
| 15.07.03 | 100.00% | 1.16% | 15.00% | 0.80% | 0.86% | 1.73% | 1.18% | 0.84% | 0.77% | 1.97% | 0.93% |
| 16.07.03 | 99.00% | 1.03% | d | 0.82% | 0.79% | 2.05% | 1.16% | 0.85% | 0.68% | 1.78% | 0.87% |
| 17.07.03 | 99.00% | 1.00% | d | 0.76% | 0.67% | 2.13% | 1.11% | 0.94% | 0.59% | 1.87% | 0.88% |
| 18.07.03 | 99.00% | 1.02% | d | 0.96% | 0.69% | 2.26% | 1.19% | 0.99% | 0.59% | 1.72% | 0.79% |
| 21.07.03 | 99.00% | 1.00% | d | 0.98% | 0.77% | 2.28% | 0.87% | 1.08% | 0.47% | 1.78% | 0.86% |

TABLE 3

| Date | Futures days remaining | Swap rate 1 | Maturity 1 | Swap rate 2 | Maturity 2 | Swap maturity check | Interpolated Swap rate | Total survived Weight (N) |
|---|---|---|---|---|---|---|---|---|
| 20.06.03 | 183.00 | 4.75% | 5.00 | 5% | 6.00 | OK | 4.8753% | 100.00% |
| 23.06.03 | 180.00 | 4.75% | 5.00 | 5% | 6.00 | OK | 4.8733% | 100.00% |
| 24.06.03 | 179.00 | 4.75% | 5.00 | 5% | 6.00 | OK | 4.8726% | 100.00% |
| 25.06.03 | 178.00 | 4.75% | 5.00 | 5% | 6.00 | OK | 4.8719% | 100.00% |
| 26.06.03 | 177.00 | 4.75% | 5.00 | 5% | 6.00 | OK | 4.8712% | 100.00% |
| 27.06.03 | 176.00 | 4.75% | 5.00 | 5% | 6.00 | OK | 4.8705% | 100.00% |
| 30.06.03 | 173.00 | 4.75% | 5.00 | 5% | 6.00 | OK | 4.8685% | 100.00% |
| 01.07.03 | 172.00 | 4.75% | 5.00 | 5% | 6.00 | OK | 4.8678% | 100.00% |
| 02.07.03 | 171.00 | 4.75% | 5.00 | 5% | 6.00 | OK | 4.8671% | 100.00% |
| 03.07.03 | 170.00 | 4.75% | 5.00 | 5% | 6.00 | OK | 4.8664% | 100.00% |
| 04.07.03 | 169.00 | 4.75% | 5.00 | 5% | 6.00 | OK | 4.8658% | 100.00% |
| 07.07.03 | 166.00 | 4.75% | 5.00 | 5% | 6.00 | OK | 4.8637% | 100.00% |
| 08.07.03 | 165.00 | 4.75% | 5.00 | 5% | 6.00 | OK | 4.8630% | 100.00% |
| 09.07.03 | 164.00 | 4.75% | 5.00 | 5% | 6.00 | OK | 4.8623% | 100.00% |
| 10.07.03 | 163.00 | 4.75% | 5.00 | 5% | 6.00 | OK | 4.8616% | 100.00% |
| 11.07.03 | 162.00 | 4.75% | 5.00 | 5% | 6.00 | OK | 4.8610% | 100.00% |
| 14.07.03 | 159.00 | 4.75% | 5.00 | 5% | 6.00 | OK | 4.8589% | 100.00% |
| 15.07.03 | 158.00 | 4.75% | 5.00 | 5% | 6.00 | OK | 4.8582% | 100.00% |
| 16.07.03 | 157.00 | 4.75% | 5.00 | 5% | 6.00 | OK | 4.8575% | 99.00% |
| 17.07.03 | 156.00 | 4.75% | 5.00 | 5% | 6.00 | OK | 4.8568% | 99.00% |
| 18.07.03 | 155.00 | 4.75% | 5.00 | 5% | 6.00 | OK | 4.8562% | 99.00% |
| 21.07.03 | 152.00 | 4.75% | 5.00 | 5% | 6.00 | OK | 4.8541% | 99.00% |
| 22.07.03 | 151.00 | 4.75% | 5.00 | 5% | 6.00 | OK | 4.8534% | 99.00% |

| Date | ΔN | Present value from change in credit spreads | Default payment | Premium payment | Daily margin | Running total |
|---|---|---|---|---|---|---|
| 20.06.03 | | 0.00 | | | | |
| 23.06.03 | 0.00% | 2.33 | 0.00 | 0.2778 | 2.0549 | 2.0549 |
| 24.06.03 | 0.00% | 7.61 | 0.00 | 0.2778 | 4.9991 | 7.0540 |
| 25.06.03 | 0.00% | 10.85 | 0.00 | 0.2778 | 2.9667 | 10.0207 |
| 26.06.03 | 0.00% | 15.25 | 0.00 | 0.2778 | 4.1171 | 14.1379 |
| 27.06.03 | 0.00% | 13.53 | 0.00 | 0.8333 | −2.5560 | 11.5819 |
| 30.06.03 | 0.00% | 20.17 | 0.00 | 0.2778 | 6.3631 | 17.9450 |
| 01.07.03 | 0.00% | 16.02 | 0.00 | 0.2778 | −4.4247 | 13.5203 |
| 02.07.03 | 0.00% | 13.36 | 0.00 | 0.2778 | −2.9390 | 10.5813 |
| 03.07.03 | 0.00% | 18.05 | 0.00 | 0.2778 | 4.4151 | 14.9964 |
| 04.07.03 | 0.00% | 19.17 | 0.00 | 0.8333 | 0.2849 | 15.2814 |

TABLE 3-continued

| | | | | | | |
|---|---|---|---|---|---|---|
| 07.07.03 | 0.00% | 21.46 | 0.00 | 0.2778 | 2.0090 | 17.2904 |
| 08.07.03 | 0.00% | 26.45 | 0.00 | 0.2778 | 4.7148 | 22.0051 |
| 09.07.03 | 0.00% | 24.50 | 0.00 | 0.2778 | −2.2248 | 19.7803 |
| 10.07.03 | 0.00% | 40.05 | 0.00 | 0.2778 | 15.2716 | 35.0519 |
| 11.07.03 | 0.00% | 39.04 | 0.00 | 0.8333 | −1.8470 | 33.2049 |
| 14.07.03 | 0.00% | 39.29 | 0.00 | 0.2778 | −0.0283 | 33.1766 |
| 15.07.03 | 0.00% | 42.68 | 0.00 | 0.2778 | 3.1147 | 36.2912 |
| 16.07.03 | 1.00% | 11.87 | 60.00 | 0.2750 | 28.9109 | 65.2021 |
| 17.07.03 | 0.00% | −0.33 | 0.00 | 0.2750 | −12.4743 | 52.7279 |
| 18.07.03 | 0.00% | 8.50 | 0.00 | 0.8250 | 8.0071 | 60.7350 |
| 21.07.03 | 0.00% | −2.08 | 0.00 | 0.2750 | −10.8503 | 49.8847 |
| 22.07.03 | 0.00% | −0.67 | 0.00 | 0.2750 | 1.1269 | 51.0116 |

TABLE 4

| 1 | 2 | 3 | 4 | 5 | 6 | 7 | 8 | 9 | 10 |
|---|---|---|---|---|---|---|---|---|---|
| — | — | — | — | — | — | — | — | — | — |
| 0.26 | (0.13) | 0.24 | (0.78) | 0.28 | 0.27 | (0.92) | 0.03 | 0.80 | 0.40 |
| 0.21 | 0.49 | 0.95 | (0.83) | 0.52 | 0.27 | (0.75) | 0.65 | (0.02) | 1.08 |
| 4.43 | 0.31 | 1.39 | (0.42) | (0.28) | 0.14 | (0.59) | 1.01 | (0.24) | 0.76 |
| 8.48 | (0.59) | 2.55 | (0.06) | (0.00) | 0.77 | (0.52) | 0.93 | (0.31) | 1.50 |
| 12.20 | (0.21) | 1.96 | (0.01) | (0.47) | 0.71 | (0.84) | 1.73 | 0.03 | 1.60 |
| 15.59 | (0.86) | 2.74 | 0.61 | (0.43) | 1.16 | (0.65) | 2.36 | 0.62 | 2.32 |
| 18.71 | (1.06) | 1.69 | 0.65 | (0.25) | 1.15 | (0.23) | 1.64 | (0.00) | 1.41 |
| 21.57 | (1.04) | 0.97 | 0.49 | 0.67 | 0.47 | 0.15 | 1.78 | (0.33) | 0.03 |
| 24.20 | (1.27) | 1.12 | 1.38 | 0.36 | 0.68 | (0.64) | 1.43 | (0.07) | 0.37 |
| 26.61 | (1.41) | 1.55 | 2.00 | 0.22 | (0.40) | 0.09 | 1.31 | 0.03 | (0.69) |
| 28.81 | (1.70) | 1.19 | 2.78 | 0.13 | (0.43) | (0.46) | 1.51 | (0.65) | (0.89) |
| 30.85 | (1.38) | 0.60 | 2.95 | 0.04 | (0.12) | (1.41) | 2.38 | (1.16) | (1.16) |
| 32.72 | (1.58) | (0.67) | 5.00 | 0.37 | (0.97) | (1.25) | 2.45 | (0.87) | (1.48) |
| 37.49 | (1.47) | (0.43) | 3.88 | (0.08) | (1.09) | (1.29) | 2.68 | (1.07) | (1.48) |
| 37.48 | (1.68) | 0.42 | 3.42 | (0.77) | (0.91) | (1.37) | 2.88 | (0.12) | (1.86) |
| 37.46 | (1.21) | (0.32) | 2.32 | 0.18 | (0.94) | (1.43) | 3.39 | (0.08) | (1.47) |
| 37.45 | (0.90) | (0.65) | 3.26 | 0.81 | (0.74) | (1.07) | 4.28 | (0.34) | (1.36) |
| — | (0.83) | (0.95) | 4.58 | 0.72 | (0.70) | (1.48) | 3.47 | (0.58) | (1.25) |
| — | (1.11) | (1.55) | 4.95 | 0.49 | (0.27) | (1.90) | 3.82 | (0.57) | (1.27) |
| — | (0.17) | (1.44) | 5.46 | 0.88 | (0.03) | (1.91) | 3.22 | (0.99) | (1.08) |
| — | (0.08) | (1.06) | 5.55 | (0.62) | 0.38 | (2.47) | 3.45 | (0.63) | (1.81) |
| — | 0.47 | (0.93) | 6.82 | (0.51) | (0.65) | (2.47) | 2.55 | (0.77) | (1.93) |
| — | 0.70 | (0.97) | 5.21 | (0.96) | 0.19 | (2.10) | 2.54 | (0.62) | (1.88) |

| 11 | 12 | 13 | 14 | 15 | 16 | 17 |
|---|---|---|---|---|---|---|
| — | — | — | — | — | — | — |
| | 0.32 | (0.08) | (0.18) | (0.34) | (0.55) | 0.05 | 0.19 |
| | 0.91 | 0.33 | (0.70) | (0.02) | (0.32) | 1.08 | 0.48 |
| | 0.91 | (0.15) | (1.42) | 0.08 | (0.08) | 1.68 | 0.82 |
| | 1.28 | 0.26 | (1.37) | (0.18) | 0.47 | 0.88 | (0.04) |
| | 0.52 | 0.36 | (1.43) | (0.45) | (0.23) | 0.96 | (0.45) |
| | 0.62 | 1.23 | (1.16) | (0.76) | (0.87) | 0.50 | (0.22) |
| | 1.08 | 1.34 | (0.76) | (0.31) | (1.03) | 0.13 | (0.87) |
| | 0.44 | 0.82 | (0.67) | (1.17) | (1.06) | (0.18) | (1.51) |
| | 0.93 | 0.68 | (0.98) | (1.91) | (0.44) | 0.20 | (1.42) |
| | 0.62 | 0.97 | (1.24) | (2.21) | (0.59) | (1.03) | (1.50) |
| | 0.35 | 0.92 | (1.48) | (2.39) | (1.29) | (0.07) | (1.45) |
| | 0.28 | 1.12 | (1.33) | (2.41) | (1.13) | (0.02) | (1.07) |
| | 0.33 | 0.77 | (0.07) | (2.62) | (0.76) | (0.76) | (1.26) |
| | (0.43) | 0.99 | 0.13 | (2.39) | (1.29) | (0.70) | (1.46) |
| | 0.10 | (0.13) | 0.79 | (2.11) | (1.29) | (0.63) | (0.90) |
| | (0.66) | (0.53) | 0.90 | (2.09) | (1.64) | (0.76) | (1.58) |
| | (1.26) | (0.48) | 1.27 | (1.60) | (1.39) | 0.14 | (1.71) |
| | (1.61) | (0.73) | 1.89 | (1.89) | (1.65) | 0.20 | (1.41) |
| | (1.73) | (0.67) | 0.64 | (1.58) | (0.98) | (0.09) | (1.48) |
| | (1.50) | (0.51) | 0.60 | (1.95) | (1.06) | (0.08) | (1.24) |
| | (1.21) | (0.63) | 0.29 | (1.57) | (1.15) | (0.24) | (1.27) |
| | (0.90) | (0.74) | 0.08 | (1.21) | (1.27) | (0.23) | (0.91) |
| | (1.22) | (0.83) | 0.05 | (0.68) | (1.66) | (0.74) | (1.43) |

TABLE 5

| Trading days | N(today) | Survived initial premium | Obligor: 1 | 2 | 3 | 4 | 5 | 6 | 7 | 8 | 9 | 10 | 11 | 12 |
|---|---|---|---|---|---|---|---|---|---|---|---|---|---|---|
| | | | Weights: | | | | | | | | | | | |
| | | | 1.00% | 1.00% | 1.00% | 1.00% | 1.00% | 1.00% | 1.00% | 1.00% | 1.00% | 1.00% | 1.00% | 1.00% |
| | | | 0.01% | 0.01% | 0.01% | 0.01% | 0.01% | 0.01% | 0.01% | 0.01% | 0.01% | 0.01% | 0.01% | 0.01% |
| 20.06.03 | 100.00% | 1.000% | 1.00% | 1.00% | 1.00% | 1.00% | 1.00% | 1.00% | 1.00% | 1.00% | 1.00% | 1.00% | 1.00% | 1.00% |
| 23.06.03 | 100.00% | 1.000% | 1.06% | 0.97% | 1.05% | 0.83% | 1.06% | 1.06% | 0.80% | 1.01% | 1.17% | 1.09% | 1.07% | 0.98% |
| 24.06.03 | 100.00% | 1.000% | 1.05% | 1.11% | 1.21% | 0.82% | 1.11% | 1.06% | 0.84% | 1.14% | 0.99% | 1.24% | 1.20% | 1.07% |
| 25.06.03 | 100.00% | 1.000% | 2.00% | 1.07% | 1.30% | 0.91% | 0.94% | 1.03% | 0.87% | 1.22% | 0.95% | 1.16% | 1.20% | 0.97% |
| 26.06.03 | 100.00% | 1.000% | 3.00% | 0.87% | 1.56% | 0.99% | 1.00% | 1.17% | 0.89% | 1.20% | 0.93% | 1.33% | 1.28% | 1.06% |
| 27.06.03 | 100.00% | 1.000% | 4.00% | 0.95% | 1.43% | 1.00% | 0.90% | 1.16% | 0.82% | 1.38% | 1.01% | 1.35% | 1.11% | 1.08% |
| 30.06.03 | 100.00% | 1.000% | 5.00% | 0.82% | 1.61% | 1.13% | 0.91% | 1.25% | 0.86% | 1.52% | 1.14% | 1.51% | 1.13% | 1.27% |
| 01.07.03 | 100.00% | 1.000% | 6.00% | 0.77% | 1.37% | 1.14% | 0.95% | 1.25% | 0.95% | 1.36% | 1.00% | 1.31% | 1.24% | 1.29% |
| 02.07.03 | 100.00% | 1.000% | 7.00% | 0.78% | 1.21% | 1.11% | 1.15% | 1.10% | 1.03% | 1.39% | 0.93% | 1.01% | 1.10% | 1.18% |
| 03.07.03 | 100.00% | 1.000% | 8.00% | 0.73% | 1.25% | 1.30% | 1.08% | 1.15% | 0.86% | 1.31% | 0.99% | 1.08% | 1.20% | 1.15% |
| 04.07.03 | 100.00% | 1.000% | 9.00% | 0.70% | 1.34% | 1.44% | 1.05% | 0.91% | 1.02% | 1.29% | 1.01% | 0.85% | 1.14% | 1.21% |
| 07.07.03 | 100.00% | 1.000% | 10.00% | 0.64% | 1.26% | 1.62% | 1.03% | 0.91% | 0.90% | 1.33% | 0.86% | 0.81% | 1.08% | 1.20% |
| 08.07.03 | 100.00% | 1.000% | 11.00% | 0.70% | 1.13% | 1.66% | 1.01% | 0.97% | 0.70% | 1.53% | 0.75% | 0.75% | 1.06% | 1.25% |
| 09.07.03 | 100.00% | 1.000% | 12.00% | 0.66% | 0.85% | 2.14% | 1.08% | 0.79% | 0.73% | 1.55% | 0.81% | 0.68% | 1.07% | 1.17% |
| 10.07.03 | 100.00% | 1.000% | 15.00% | 0.69% | 0.91% | 1.88% | 0.98% | 0.77% | 0.72% | 1.60% | 0.77% | 0.68% | 0.91% | 1.22% |
| 11.07.03 | 100.00% | 1.000% | 15.00% | 0.64% | 1.09% | 1.77% | 0.83% | 0.80% | 0.70% | 1.65% | 0.97% | 0.60% | 1.02% | 0.97% |
| 14.07.03 | 100.00% | 1.000% | 15.00% | 0.74% | 0.93% | 1.52% | 1.04% | 0.80% | 0.69% | 1.76% | 0.98% | 0.68% | 0.86% | 0.88% |
| 15.07.03 | 100.00% | 1.000% | 15.00% | 0.80% | 0.86% | 1.73% | 1.18% | 0.84% | 0.77% | 1.97% | 0.93% | 0.71% | 0.73% | 0.90% |
| 16.07.03 | 99.00% | 0.990% | d | 0.82% | 0.79% | 2.05% | 1.16% | 0.85% | 0.68% | 1.78% | 0.87% | 0.73% | 0.65% | 0.84% |
| 17.07.03 | 99.00% | 0.990% | d | 0.76% | 0.67% | 2.13% | 1.11% | 0.94% | 0.59% | 1.87% | 0.88% | 0.73% | 0.63% | 0.85% |
| 18.07.03 | 99.00% | 0.990% | d | 0.96% | 0.69% | 2.26% | 1.19% | 0.99% | 0.59% | 1.72% | 0.79% | 0.77% | 0.68% | 0.89% |
| 21.07.03 | 99.00% | 0.990% | d | 0.98% | 0.77% | 2.28% | 0.87% | 1.08% | 0.47% | 1.78% | 0.86% | 0.61% | 0.74% | 0.86% |

What is claimed is:

1. A data processing system for valuing a futures contract that is based on a basket of credit default swaps as underlyings, the system comprising:
a physical data storage medium for storing credit spread values for each credit default swap in the basket for a plurality of individual valuation time instances for said futures contract wherein said data storage medium stores a plurality of event data for individual credit default swaps in the basket, said event data indicating whether a credit event has or has not occurred for the respective credit default swap, and
a calculation processor connected to said data storage medium that calculates a value of said futures contract for an individual valuation time instance based on said credit spread values of the credit default swaps in the basket, thereby producing and storing the value of said futures contract internally; and
wherein said calculation processor disregards the credit spread values of credit default swaps in the basket having experienced a credit event when calculating said value of said futures contract.

2. The data processing system of claim 1, wherein said calculation unit calculates a first credit spread average by averaging all credit spread values of the credit default swaps in the basket that have not experienced a credit event for a first valuation time instance and calculating calculates said value of said futures contract based on said first credit spread average.

3. The data processing system of claim 2, wherein said calculation processor further calculates a second credit spread average by averaging all credit spread values of the credit default swaps in the basket that have not experienced a credit event for a second valuation time instance preceding said first valuation time instance and calculates said value of said futures contract also based on said second credit spread average.

4. The data processing system of claim 3, wherein said calculation processor further calculates a third credit spread average by averaging all credit spread values of the credit default swaps in the basket that have not experienced a credit event for the first valuation time instance of said futures contract and calculates said value of said futures contract also based on said third credit spread average.

5. The data processing system of claim 1, wherein said calculation processor obtains a first credit spread value for each credit default swap of the credit default swaps in the basket that have not experienced a credit event for a first valuation time instance.

6. The data processing system of claim 5, wherein said calculation processor obtains a second credit spread value for each credit default swap of the credit default swaps in the basket that have not experienced a credit event for a second valuation time instance preceding said first valuation time instance.

7. The data processing system of claim 6, wherein said calculation processor obtains a third credit spread value for each credit default swap of the credit default swaps in the basket that have not experienced a credit event for the first valuation time instance of said futures contract.

8. The data processing system of claim 1, wherein said calculation processor calculates said value of said futures contract based on the credit spread values of the credit default swaps in the basket for a respective valuation time instance and the corresponding credit spread values of the credit default swaps in the basket of a respective earlier valuation time instance.

9. The data processing system of claim 1, wherein said calculation unit calculates said value of said futures contract also based on a defined payment per unit notional paid to a protection buyer following a credit event.

10. The data processing system of claim 1, wherein said data storage stores weights for each credit default swap in the basket, and said calculation unit calculates said value of said futures contract also based on said weights.

11. The data processing system of claim 1, wherein said valuation time instance is a trading day.

12. A data processing method executed by a computer processor valuing a futures contract that is based on a basket of credit default swaps as underlyings, the method comprising:
storing, by a computer processor, credit spread values for each credit default swap in the basket for a plurality of individual valuation time instances for said futures contract; and
calculating and storing internally, by a computer processor, a value of said futures contract for an individual valuation time instance based on said credit spread values of the credit default swaps in the basket;
storing event data for individual credit default swaps in the basket, by a computer processor, said event data indicating whether or not a credit event has occurred for the respective credit default swap, and
disregarding the credit spread values of credit default swaps that have experienced a credit event when calculating, by a computer processor, said value of said futures contract.

13. The data processing method of claim 12, further comprising:
calculating a first credit spread average by averaging all credit spread values of the credit default swaps in the basket that have not experienced a credit event for a given valuation time instance, and
calculating said value of said futures contract based on said first credit spread average.

14. The data processing method of claim 13, further comprising:
calculating a second credit spread average by averaging all credit spread values of the credit default swaps in the basket that have not experienced a credit event relating to a valuation time instance preceding one of the plurality of said individual valuation time instances and
calculating said value of said futures contract also based on said second credit spread average.

15. The data processing method of claim 14, further comprising:
calculating a third credit spread average by averaging all credit spread values of the credit default swaps in the basket that have not experienced a credit event for a valuation time instance of said futures contract, and
calculating said value of said futures contract also based on said third credit spread average.

16. The data processing method of claim 12, further comprising:
obtaining a first credit spread value for each credit default swap of the credit default swaps in the basket that have not experienced a credit event relating to said first valuation time instance.

17. The data processing method of claim 16, further comprising:
obtaining a second credit spread value for each credit default swap in the basket that has not experienced a credit event relating to a second valuation time instance preceding said first valuation time instance.

18. The data processing method of claim 17, further comprising:
obtaining a third credit spread value for each credit default swap in the basket that has not experienced a credit event relating to the first valuation time instance of said futures contract.

19. The data processing method of claim 12, further comprising:
calculating said value of said futures contract based on the credit spread values of the credit default swaps in the basket of the evaluated at said plurality of individual valuation time instances and
calculating the corresponding credit spread values of respective earlier valuation time instances.

20. The data processing method of claim 12, further comprising:
calculating said value of said futures contract also based on a defined payment per unit notional paid to a protection buyer following a credit event.

21. The data processing method of claim 12, further comprising:
storing weights for each credit default swap in the basket, and
calculating said value of said futures contract also based on said weights.

22. The data processing method of claim 12, wherein a said individual valuation time instance is a trading day.

23. A computer-readable storage medium storing instructions that, when executed by a processor, cause the processor to perform the following steps:
value a futures contract that is based on a basket of credit default swaps as underlyings,
access a storage having stored therein credit spread values for each credit default swap in the basket for a plurality of individual valuation time instance for said futures contract, and
calculate a value of said futures contract for an individual valuation time instance based on said credit spread values of the credit default swaps in the basket,
store a plurality of event data for individual credit default swaps in the basket, said event data indicating that a credit event has occurred for at least one credit default swap in the basket, and
disregard the credit spread values of credit default swaps in the basket that have experienced a credit event when calculating said value of said futures contract.

* * * * *